(12) United States Patent
Bradshaw

(10) Patent No.: US 11,794,375 B2
(45) Date of Patent: Oct. 24, 2023

(54) SPLIT MOLD INSERT FOR FORMING A RELIEF PORTION OF A MOLDED ARTICLE AND MOLD STACK INCORPORATING SAME

(71) Applicant: HUSKY INJECTION MOLDING SYSTEMS LTD., Bolton (CA)

(72) Inventor: Maxfield Paul Bradshaw, Etobicoke (CA)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 1106 days.

(21) Appl. No.: 16/463,204

(22) PCT Filed: Nov. 22, 2017

(86) PCT No.: PCT/CA2017/051396
§ 371 (c)(1),
(2) Date: May 22, 2019

(87) PCT Pub. No.: WO2018/107273
PCT Pub. Date: Jun. 21, 2018

(65) Prior Publication Data
US 2019/0375134 A1 Dec. 12, 2019

Related U.S. Application Data

(60) Provisional application No. 62/433,883, filed on Dec. 14, 2016.

(51) Int. Cl.
*B29B 11/08* (2006.01)
*B29B 11/14* (2006.01)
*B29C 45/34* (2006.01)

(52) U.S. Cl.
CPC .............. *B29B 11/08* (2013.01); *B29B 11/14* (2013.01); *B29C 45/34* (2013.01);
(Continued)

(58) Field of Classification Search
CPC ......... B29B 11/08; B29B 11/14; B29C 45/34; B29C 2949/0745; B29C 2949/0769;
(Continued)

(56) References Cited

U.S. PATENT DOCUMENTS 3,327,353 A 6/1967 Eggenberger
4,133,260 A 1/1979 Gundal
(Continued)

FOREIGN PATENT DOCUMENTS

CA 2977296 A1 9/2016
EP 0704292 A1 4/1996
(Continued)

OTHER PUBLICATIONS

International Search Report; Pengfai Zhang dated Feb. 16, 2018.

*Primary Examiner* — Jacob T Minskey
*Assistant Examiner* — Caroline Beha

(57) ABSTRACT

A mold stack comprises: a split mold insert split into parts, each having a mating face with an inner face region, an offset, and an outer face region, the insert further having a male projecting portion with a shutoff face and an outer surface, at least a part of the inner face region terminating at the shutoff face, the offset terminating at the outer surface; and an adjacent mold stack component having an associated a female receptacle, the insert having a cleaning configuration wherein: the shutoff face acts as a molding surface; the male projecting portion cooperates with the female receptacle to define a melt barrier; the complementary inner face regions are spaced apart to form an extension of the mold cavity terminating, at least in part, at the shutoff face; and the complementary offsets cooperate to prevent melt from passing therebetween and to guide melt towards the melt barrier.

21 Claims, 19 Drawing Sheets

(52) U.S. Cl.
CPC .............................. *B29C 2949/078* (2022.05); *B29C 2949/0745* (2022.05); *B29C 2949/0769* (2022.05); *B29C 2949/0774* (2022.05)

(58) Field of Classification Search
CPC ...... B29C 2949/0774; B29C 2949/078; B29C 2949/0732; B29C 2949/0744; B29C 45/33; B29C 49/06; B29C 45/1753; B29C 45/26; B29K 2105/258; B29L 2031/712; B29L 2031/7158
See application file for complete search history.

(56) References Cited

U.S. PATENT DOCUMENTS

| | | | |
|---|---|---|---|
| 4,790,173 | A | 12/1988 | Boutcher, Jr. |
| 4,971,803 | A | 11/1990 | Li et al. |
| 5,002,479 | A | 3/1991 | Brown et al. |
| 5,135,385 | A | 8/1992 | Fuzukawa et al. |
| 5,397,230 | A | 3/1995 | Brew |
| 5,536,166 | A | 7/1996 | Schad |
| 5,599,567 | A | 2/1997 | Gellert |
| 5,853,773 | A | 12/1998 | Choi |
| 5,884,520 | A | 3/1999 | Bakermans |
| 5,964,134 | A | 10/1999 | Arends |
| 6,055,904 | A | 5/2000 | Chun et al. |
| 6,200,122 | B1 | 3/2001 | Chun et al. |
| 6,258,311 | B1 * | 7/2001 | Jens .................. B29C 41/28 205/70 |
| 6,408,673 | B1 | 6/2002 | Korner et al. |
| 7,128,865 | B2 | 10/2006 | Martin |
| 7,452,199 | B2 | 11/2008 | Eigler et al. |
| 7,481,642 | B2 | 1/2009 | Niewels |
| 7,939,009 | B2 | 5/2011 | Balboni et al. |
| 8,061,409 | B2 | 11/2011 | Iwasaki et al. |
| D699,769 | S * | 2/2014 | Witz ........................ D15/136 |
| D699,770 | S | 2/2014 | Kmoch et al. |
| 8,709,326 | B2 | 4/2014 | Sakamoto |
| D714,368 | S | 9/2014 | Kmoch et al. |
| 9,090,010 | B2 | 7/2015 | Witz et al. |
| 2003/0070693 | A1 | 4/2003 | Stratford et al. |
| 2006/0283210 | A1 | 12/2006 | Dubuis et al. |
| 2007/0212443 | A1 | 9/2007 | Li et al. |
| 2009/0098232 | A1 | 4/2009 | Niewels |
| 2013/0142902 | A1 * | 6/2013 | Papa ................ B29C 45/1775 425/577 |
| 2013/0341814 | A1 * | 12/2013 | Witz ................ B29C 45/1753 425/546 |

FOREIGN PATENT DOCUMENTS

| | | | |
|---|---|---|---|
| EP | 2343176 A1 | 7/2001 | |
| EP | 3059064 A1 | 8/2016 | |
| JP | 2867519 B2 | 3/1999 | |
| WO | 2013016816 A1 | 2/2013 | |
| WO | 2014117246 A1 | 8/2014 | |
| WO | 2016149800 A1 | 9/2016 | |
| WO | WO-2016149800 A1 * | 9/2016 | ............. B29C 33/72 |

* cited by examiner

SPLIT MOLD INSERT FOR FORMING A RELIEF PORTION OF A MOLDED ARTICLE AND MOLD STACK INCORPORATING SAME

TECHNICAL FIELD

The present disclosure relates to injection molding, and in particular to a split mold insert for forming a relief portion of a molded article and a mold stack incorporating same.

BACKGROUND

A molding system, such as an injection molding system, forms molded articles from a molding material. The molding material may be a plastic or resin material, such as Polyethylene Terephthalate (PET) for example. The molded article may be a container, or a container precursor such as a preform capable of being subsequently blown into a beverage container (e.g. a plastic bottle).

An injection molding system may heat the molding material to a homogeneous molten state, in which state the molding material may be referred to as "melt." The melt may be injected, under pressure, into a molding cavity that is defined by a collection of components referred to as a "mold stack." The mold stack typically includes, among other components, a female cavity piece and a male core piece attached to a cavity plate and a core plate respectively. The molding cavity that is defined by the mold stack may have a shape that substantially corresponds to a final cold-state shape of the article to be molded.

During injection of melt, a clamp force is applied to the cavity and core plates that is sufficient to keep the cavity and the core pieces together despite the opposing force of the pressurized melt within the molding cavity. Once the molding cavity has been filled with melt, the molded article is typically allowed to cool and harden within the molding cavity for a brief period of time before it is stripped from the core piece and ejected from the mold.

A molded article such as a preform may have a neck portion (or "neck finish") having various features in relief. The neck portion features may include one or more of: threads for accepting and retaining a closure assembly (e.g. a bottle cap); an anti-pilferage assembly configured to cooperate with the closure assembly to indicate whether the end product (e.g. a beverage container filled with a beverage) has been tampered with; and a support ledge that cooperates with parts of the molding system. The relief of these features is such that removal of the neck portion from a molding cavity defined by a unitary female cavity piece would be difficult or impossible. For this reason, the neck portion is typically defined by a split mold insert (also referred to as a neck ring) designed to separate laterally into two or more parts/halves to release the neck portion of the cooled molded article for axial ejection from the core piece.

At the beginning of an injection molding cycle, a molding cavity is empty, i.e. filled with air. As melt is injected, the melt progressively replaces the air within the molding cavity. The air is typically vented from the molding cavity through vents that are defined between mold stack components at or near the end of the melt flow path within the molding cavity. Vents may be sized to permit passage of a gas (normally air) therethrough without permitting passage of melt therethrough. The vent sizes may be set based on the type and/or viscosity of the melt to be used. For example, in the case where the molding material is PET, the vents may comprise gaps approximately 30 to 40 microns wide. The venting may promote molded article quality by reducing or eliminating a risk of trapped air within the molding cavity, which might otherwise cause imperfections in the molded article.

When an injection molding system is operated over many molding cycles, a residue may accumulate on vent surfaces. The residue may for example be made up of material dust, contaminants or other particles. An excessive buildup of such residue may prevent air from being properly or completely vented from the molding cavity, which may jeopardize the quality of the molded article.

SUMMARY

According to one aspect of the present disclosure, there is provided a split mold insert for defining a relief portion of a molded article, comprising: a body defining a mold cavity for the relief portion of the molded article, the body having a male projecting portion with a shutoff face, the shutoff face for selectively defining, in a molding configuration of the split mold insert, a parting line with an adjacent mold stack component and, in a cleaning configuration of the split mold insert, a molding surface, the male projecting portion having an outer surface configured to cooperate with a female receptacle associated with the adjacent mold stack component to provide a melt barrier in the cleaning configuration of the split mold insert, the body being split into a plurality of split mold insert parts that are separable for ejection of the molded article, each split mold insert part having a mating face for mating with a complementary mating face of an adjacent one of the split mold insert parts, the mating face having an inner face region adjacent to the mold cavity, an offset, and an outer face region on an opposite side of the offset from the inner face region, wherein the offset terminates at the outer surface of the male projecting portion, wherein at least a part of the inner face region terminates at the shutoff face of the male projecting portion, and wherein the offset of the split mold insert part is configured to cooperate with the offset of the adjacent one of the split mold insert parts to prevent melt from passing between the offsets and to guide melt towards the melt barrier.

In some embodiments, the inner and outer face regions occupy different planes. In such embodiments, the offset may be orthogonal to each of the planes occupied by the inner face region and the outer face region respectively.

In some embodiments, the offset has a first portion that is substantially parallel to an axis of the split mold insert part and a second portion that diverges from the axis towards the outer surface of the male projecting portion. The second portion of the offset may be substantially orthogonal to the first portion of the offset. The second portion of the offset may be at least partially curved. In such embodiments, the offset may be substantially J-shaped.

In some embodiments, the offsets of the complementary mating faces overlap with one another and define a gap therebetween, the gap being substantially constant regardless of whether the split mold insert is in the cleaning configuration or in a molding configuration, the gap defining a vent permitting passage of gas, but preventing passage of melt, therethrough.

In some embodiments, the male projecting portion of the split mold insert is tapered. The outer surface of the male projecting portion may be frustoconical, and the offset may terminate at the frustoconical outer surface.

In some embodiments, the shutoff face of the male projecting portion is annular and has a rounded peripheral edge, the male projecting portion has a flared base, and the offset terminates in an outer surface of the male projecting portion between the rounded peripheral edge of the shutoff face and the flared base of the male projecting portion.

In some embodiments, the plurality of split mold insert parts is a pair of split mold insert halves.

According to another aspect of the present disclosure, there is provided a mold stack for molding a molded article having relief portion, comprising: a split mold insert split into a plurality of parts that are separable for ejection of the molded article, each split mold insert part having a mating face for mating with a complementary mating face of an adjacent one of the split mold insert parts, each mating face having an inner face region adjacent to a mold cavity, an offset, and an outer face region on an opposite side of the offset from the inner face region, the split mold insert further having a male projecting portion with a shutoff face and an outer surface, at least a part of the inner face region of each mating face terminating at the shutoff face of the male projecting portion, the offset of each mating face terminating at the outer surface of the male projecting portion; and an adjacent mold stack component having an associated a female receptacle, the split mold insert having a cleaning configuration wherein: the shutoff face of the male projecting portion acts as a molding surface; the male projecting portion cooperates with the female receptacle to define a melt barrier, the complementary inner face regions of the split mold insert parts are spaced apart to form an extension of the mold cavity, the mold cavity extension terminating, at least in part, at the shutoff face of the split mold insert that acts as the molding surface; and the complementary offsets cooperate to prevent melt from passing therebetween and to guide melt towards the melt barrier.

In some embodiments, the adjacent mold stack component is a cavity insert and the female receptacle is defined in a cavity flange associated with the cavity insert.

In some embodiments, the inner and outer face regions of the mating face of each split mold insert part occupy different planes. In such embodiments, the offset of each mating face may be orthogonal to each of the planes occupied by the inner face region and the outer face region, respectively, of the mating face.

In some embodiments, the offset of each mating face has a first portion that is substantially parallel to an operational axis of the mold stack and a second portion that diverges from the operational axis towards the outer surface of the male projecting portion. The second portion of the offset may be substantially orthogonal to the first portion of the offset. The second portion of the offset may be at least partially curved. The offset may be substantially J-shaped.

In some embodiments, the offsets of the respective complementary mating faces overlap with one another and define a gap therebetween, the gap being substantially constant regardless of whether the split mold insert is in the cleaning configuration or in a molding configuration, the gap defining a vent permitting passage of gas, but preventing passage of melt, therethrough.

In some embodiments of the mold stack, the outer surface of the male projecting portion is frustoconical and the offset terminates at the frustoconical outer surface.

In some embodiments of the mold stack, the shutoff face of the male projecting portion of the split mold insert is annular and has a rounded peripheral edge, wherein the male projecting portion has a flared base, and wherein the offset terminates in an outer surface of the male projecting portion between the rounded peripheral edge of the shutoff face and the flared base of the male projecting portion.

Other features will become apparent from the drawings in conjunction with the following description.

DESCRIPTION OF THE DRAWINGS

In the figures, which illustrate non-limiting example embodiments.

DETAILED DESCRIPTION OF THE NON-LIMITING EMBODIMENT(S)

Figure 1:
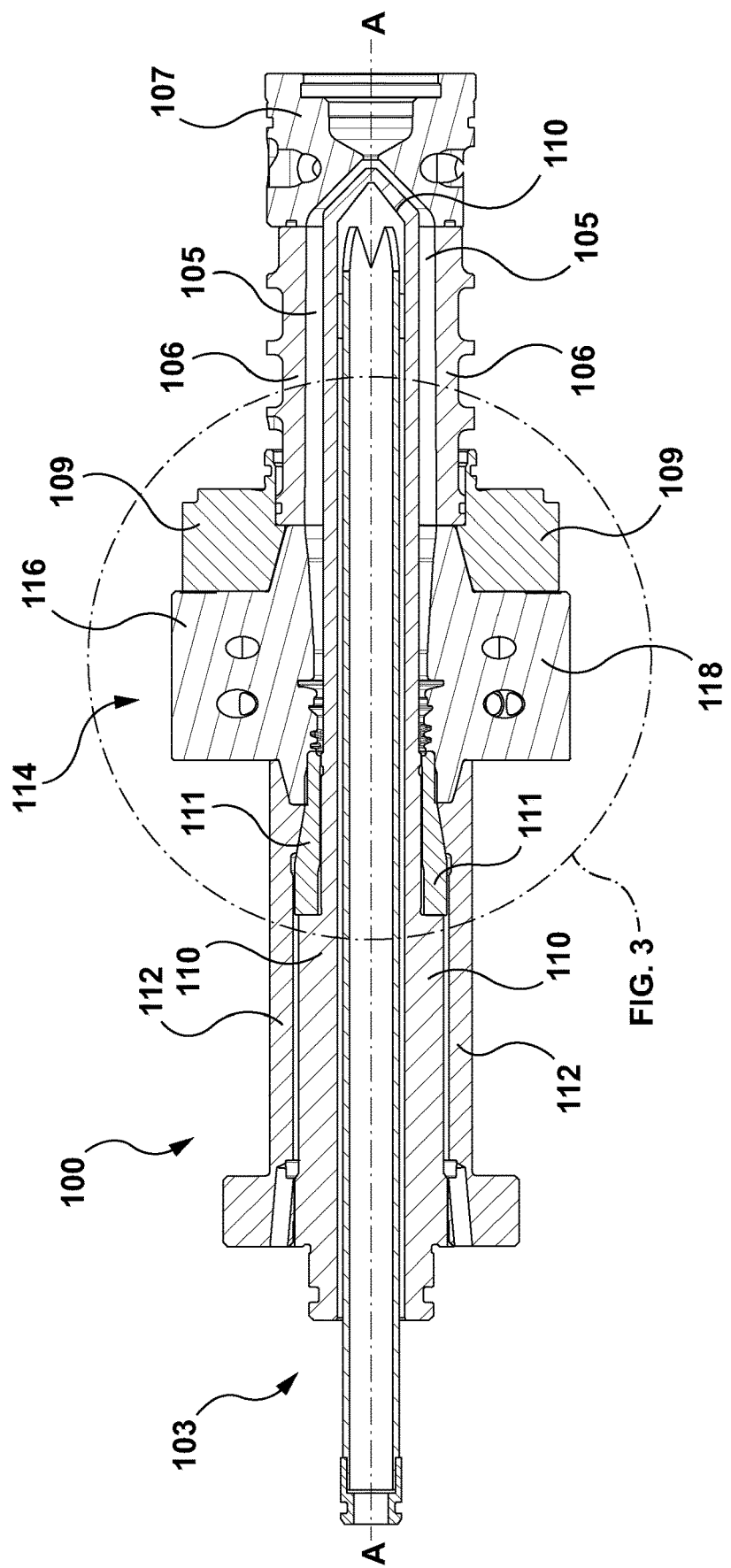
FIG. 1 is a cross-sectional view of a portion of a mold illustrating a single mold stack in a standard molding configuration.

In the description that follows, terms such as "upper," "lower," "top," "vertical," "downwardly" and "upwardly" used with respect to system components in the drawings should not be understood to necessarily connote a particular orientation of the components during use.

With reference to FIG. 1, there is depicted a longitudinal cross-section of a single mold stack 103. The example mold stack 103 produces a molded article, which in this example is a preform 101 illustrated in FIG. 2. It will be appreciated that the mold stack 103 may be one of many similar mold stacks (not illustrated) within a mold 100 that may collectively mold numerous preforms in a single batch during a single injection molding cycle. The mold 100 may include other components, which have been omitted from FIG. 1 for the sake of brevity.

Figure 2:
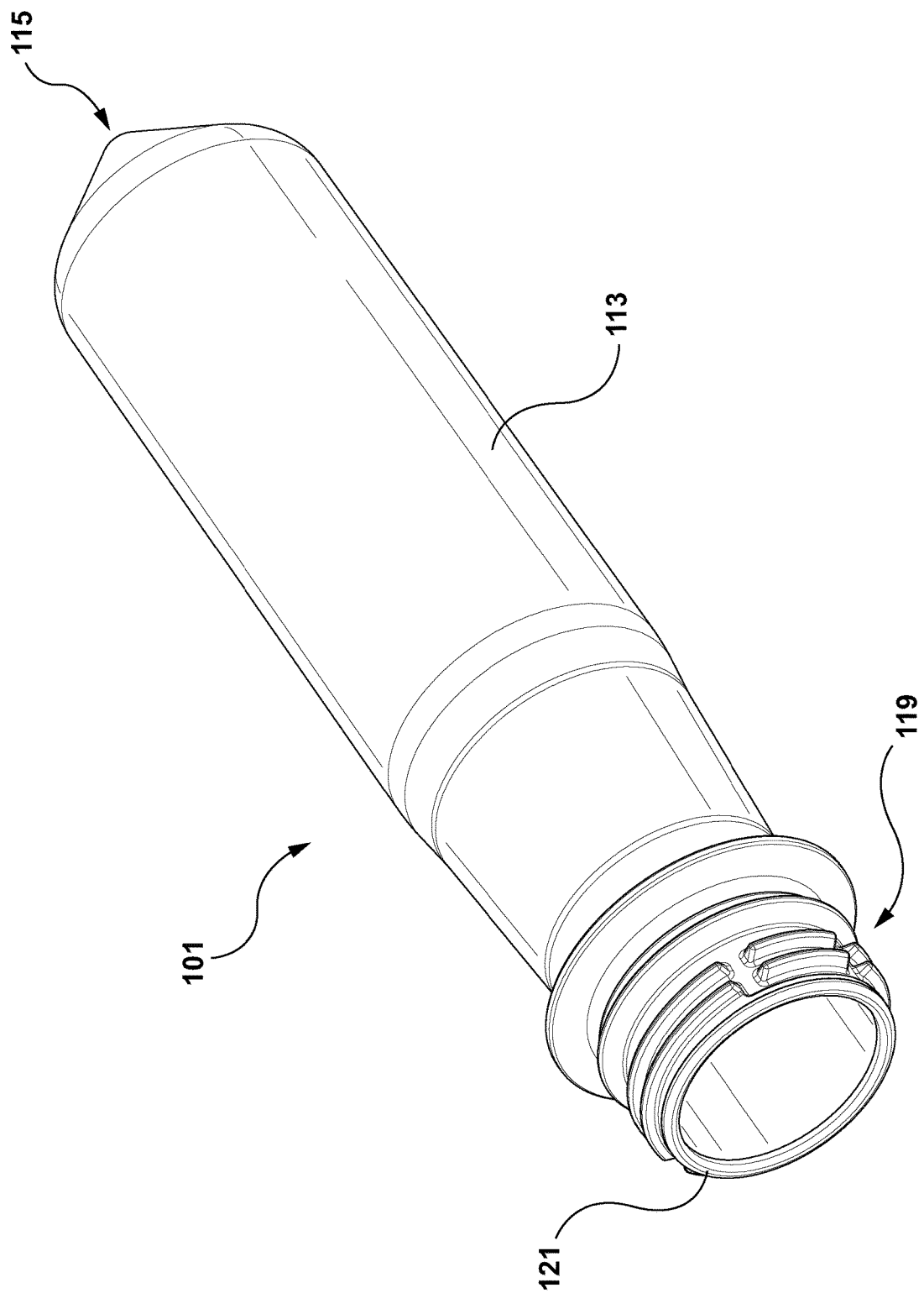
FIG. 2 is a perspective view of a molded article that may be molded by the mold of FIG. 1 in the standard molding configuration.

The mold stack 103 of FIG. 1 is in a production or molding configuration, i.e. in a configuration suitable for receiving melt into the molding cavity 105 and forming the preform 101 shown in FIG. 2.

It will be appreciated that the mold stack 103 also has other configurations, including a vent-cleaning configuration (also referred to as a "residue-cleaning configuration" or simply as a "cleaning configuration"), that will be described below.

The mold stack 103 includes a cavity insert 106 (a form of cavity piece), a gate insert 107, and a cavity flange 109. The cavity flange 109 is considered to be associated with the cavity insert 106, and serves to retain the cavity insert 106, and gate insert 107, within a bore in a cavity plate (not depicted). In an alternative embodiment, the cavity insert 106 and cavity flange 109 could be a unitary component. The cavity insert 106 defines an exterior shape of a body 113 (FIG. 2) of the preform 101 to be molded, which in this case is substantially cylindrical. The gate insert 107 defines an exterior shape of a closed end 115 (FIG. 2) of the preform 101 to be molded, which in this case is substantially conical. The gate insert 107 also defines a gate (aperture) through which melted molded material is injected into the molding cavity 105.

For clarity, the components 106 and 107 may be referred to as "inserts" because they are designed as modular components for insertion into a bore in a cavity plate (not depicted), to facilitate mold manufacturing and servicing. In alternative embodiments, the cavity piece 106 and gate insert 107 could be integral with a cavity plate for example.

The mold stack 103 further includes a core insert 110 (a form of core piece) that defines an interior surface of the preform 101 to be molded, a core ring 111 configured to define a portion of the top sealing surface 121 of the preform 101 (FIG. 2), and a lock ring 112. The core ring 111 and lock ring 112 are configured to retain the core insert 110 with a core plate (not depicted).

The mold stack 103 further includes a split mold insert 114 for defining the neck finish 119 of the preform 101 (FIG. 2). The split mold insert 114 of the present embodiment comprises a pair of complementary split mold insert halves 116, 118 which are laterally (vertically in FIG. 1) separable, e.g. for preform ejection.

The mold stack 103 has an operational axis A (FIG. 1). The operational axis A may be considered as an axis along which major components of the mold 100 are moved during operation of the mold through an injection molding cycle. Specifically the core insert 110, core ring 111, lock ring 112 and split mold insert 114 may be movable as a unit along operational axis A away from cavity insert 106, gate insert 107, and cavity flange 109, e.g. when opening the mold for ejecting the preform 101 or closing the mold in preparation for a subsequent injection molding cycle. Further, the split mold insert 114 may be movable along operational axis A relative to the core 110, while supporting the neck finish 119 of a freshly molded preform 101, to facilitate stripping of the preform 101 from the core insert 110 during normal molding operation.

The mold stack 103 depicted in FIG. 1 may be referred to as a core lock type of mold stack. The term "core lock" reflects a design whereby the split mold insert halves 116, 118 are "locked" together laterally (vertically in FIG. 1) by virtue of being snugly seated within a female receptacles defined on adjacent mold stack components, which in this case is a cavity flange 109 and the lock ring 112, as clamping pressure is applied to the mold stack 103 in the axial direction. This relationship is illustrated in greater detail in FIG. 3.

Figure 3:
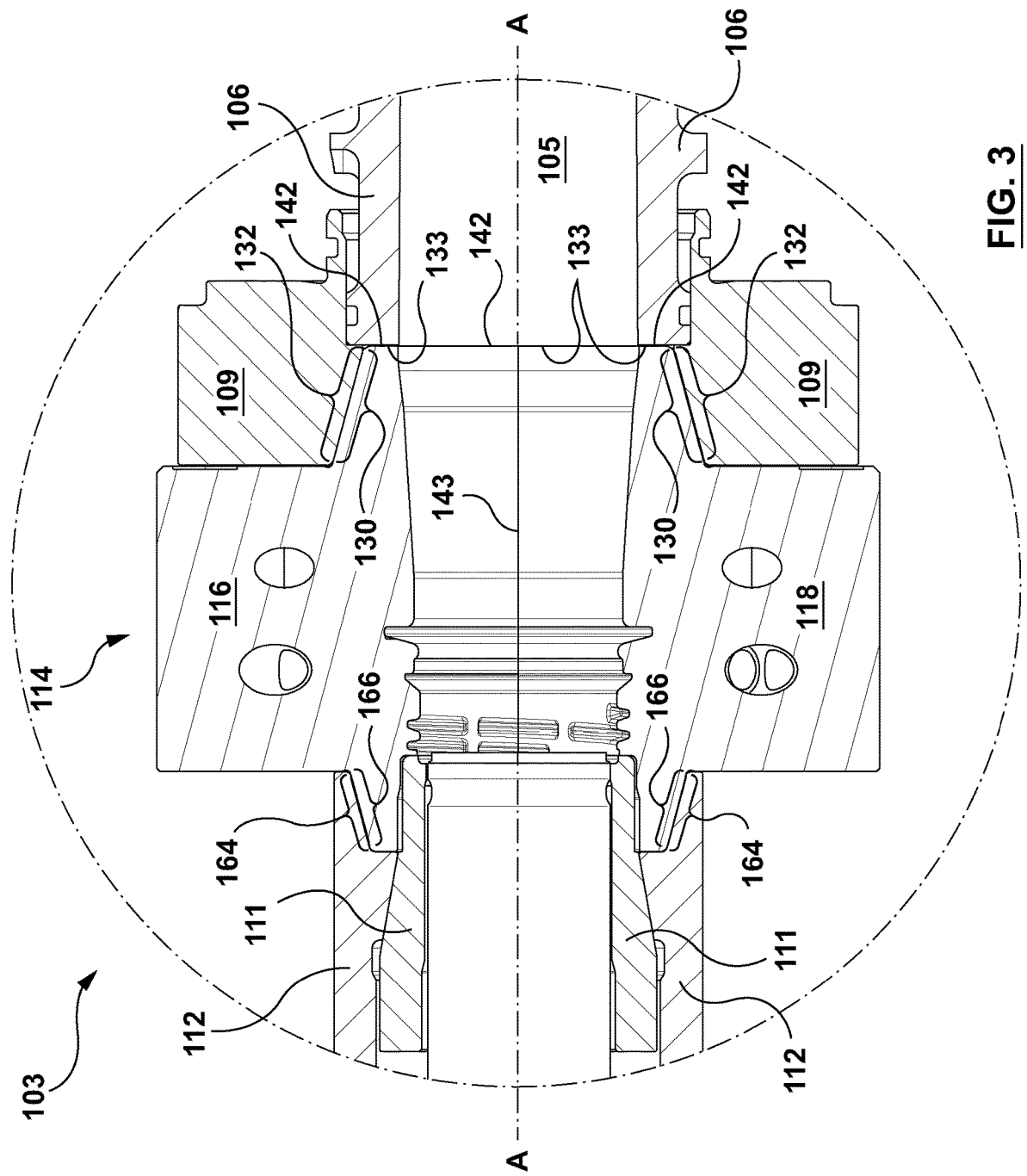
FIG. 3 is a close up view of a portion of the cross-sectional view of FIG. 1 with a core insert element removed for clarity.

Referring to FIG. 3, a close-up cross-sectional elevation view of a portion of mold stack 103 is depicted. FIG. 3 illustrates the interaction between the core ring 111, split mold insert 114, cavity flange 109 and cavity insert 106 when the example core lock type mold stack 103 is in the molding configuration. For clarity, the core insert 110 is omitted from FIG. 3, so that split line 143 between the split mold insert halves 116, 118 is visible.

As illustrated, the cavity flange 109 defines a tapered female receptacle 130 having a generally frusto-conical shape. The adjacent split mold insert 114 has a tapered male projecting portion 132 with a complementary shape (i.e. generally frusto-conical) that allows the tapered male projecting portion 132 to be snugly received within the tapered female receptacle 130 when the split mold insert 114 and the cavity insert 106 are in the mated molding configuration of FIG. 3.

The male projecting portion 132 has a shutoff face 142, which is annular in the present embodiment. The cavity insert 106, which is also adjacent to split mold insert 114 in the present embodiment, has a complementary shutoff face 133. As will be described, these shutoff faces will become molding surfaces when the mold stack 103 is placed into a cleaning configuration.

Figure 4:
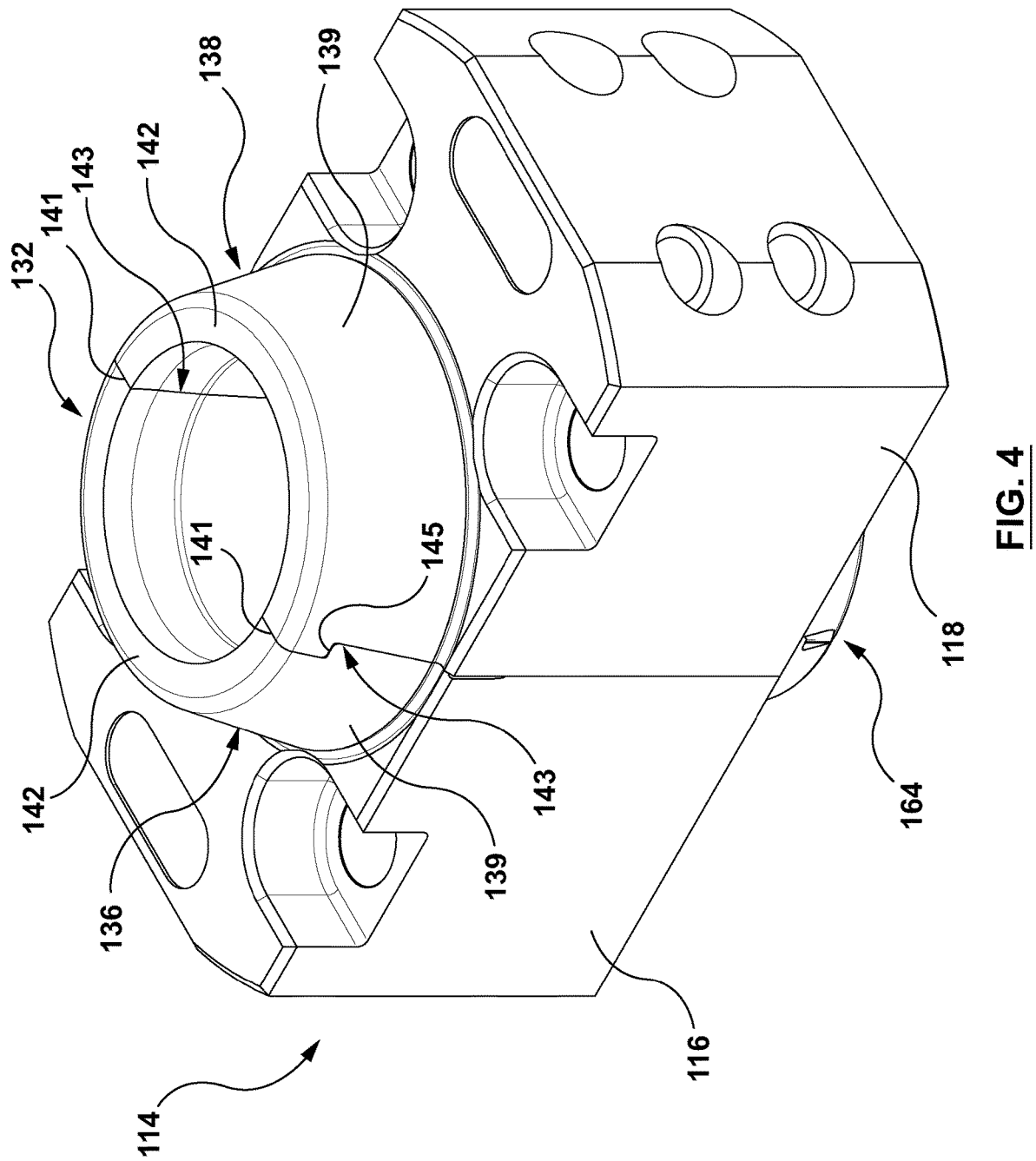
FIGS. 4 and 5 are a perspective view and plan view, respectively, of a split mold insert component of the mold of FIG. 1 in the standard molding configuration.
Figure 5:
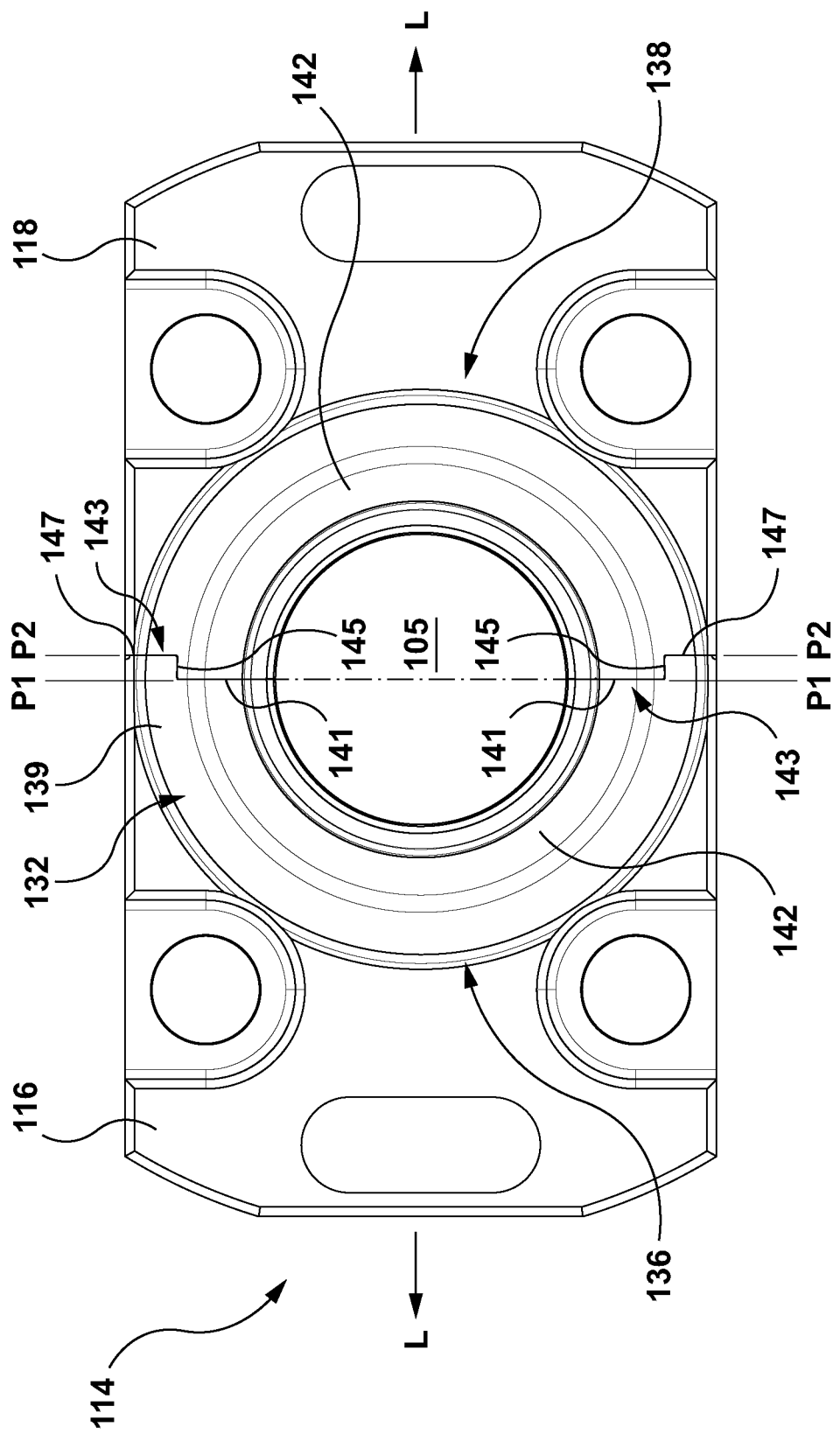

Referring to FIGS. 4 and 5, the split mold insert 114 is shown in perspective view and plan view, respectively, in isolation from other mold stack components. In each of FIGS. 4 and 5, the spit mold insert 114 is shown in a molding configuration in which its halves 116, 118 are mated.

As best seen in FIG. 5, the split line 143 that splits split mold insert 114 into two halves 116 and 118 has, relative to the central mold cavity 105, a proximal portion 141, an offset portion 145, and a distal portion 147. In the present embodiment, the proximal and distal portions 141 and 147 of split line 143 are each orthogonal to the axis L of lateral separation of the two halves 116, 118, whereas the offset portion 145 is parallel to the axis L. The offset portion 145 terminates at the tapered outer surface 139 of the male projecting portion 132 (see FIG. 4). More specifically, the offset portion 145 terminates at the frustoconical face 139 of the male projecting portion 132. The offset portion 145 is one of the mechanisms used to prevent uncontrolled flashing from between the split mold insert halves 116, 118 when slightly separated in a cleaning configuration, as will be described.

The split mold insert 114 also has a tapered male portion 164, on an opposite side from male projecting portion 132, for mating with a complementary female seat defined in lock ring 112 (FIG. 4; see also FIG. 3). The central portion of split mold insert 114 that defines the mold cavity 105, e.g. extending between and including male portions 132 and 164, may be considered as the body of the split mold insert 114.

Figure 6:
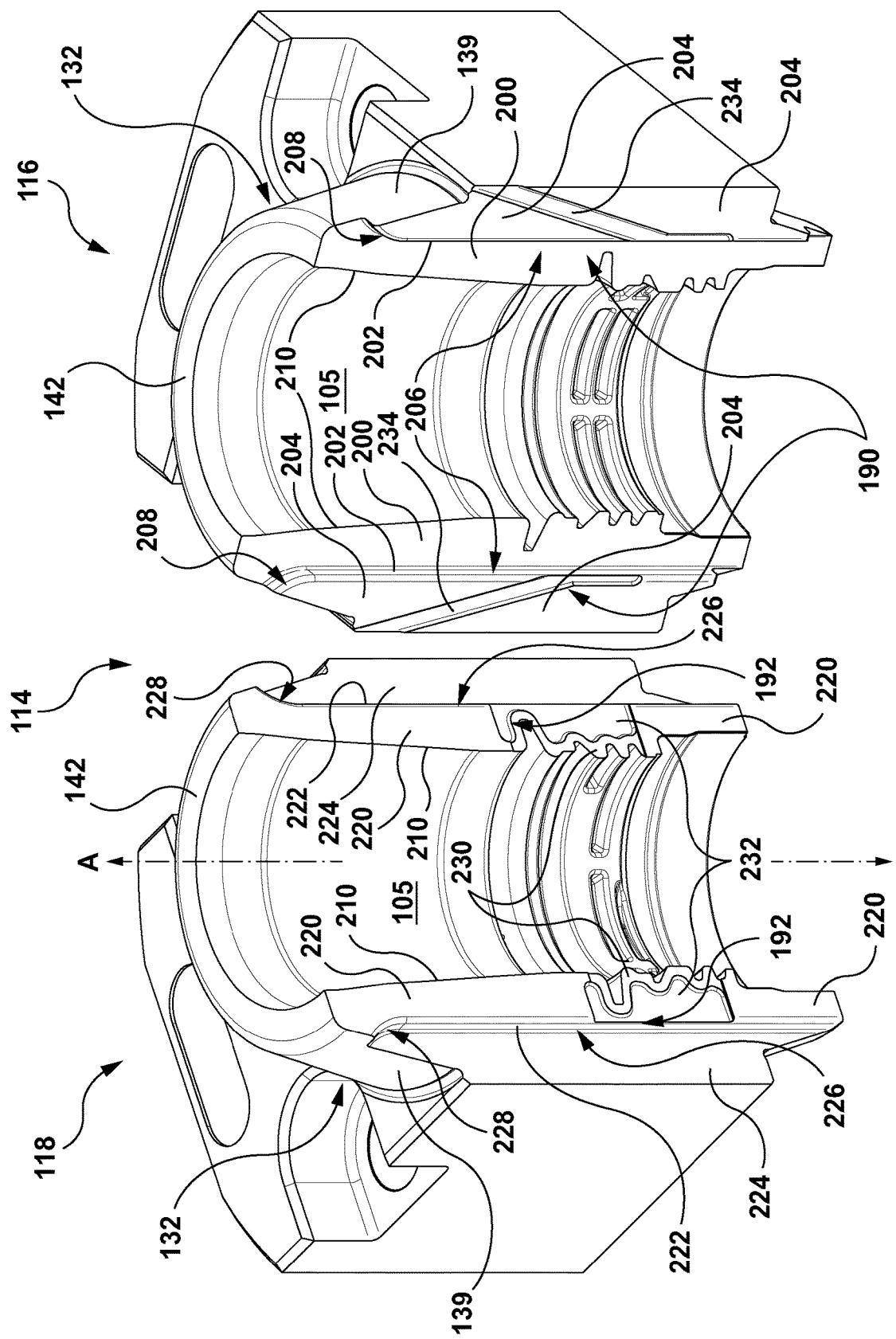
FIG. 6 is a perspective view of the split mold insert of FIGS. 4 and 5 separated into its two component halves with their respective mating faces visible.

FIG. 6 illustrates the split mold insert 114 in perspective view with the split mold insert halves 116, 118 oriented so that their respective mating faces 190, 192 are visible. It will be appreciated that the view of FIG. 6 is for illustration purposes only and that the split mold insert halves 116, 118 are not actually used in this orientation.

Each of the complementary mating faces 190, 192 has an inner face region 200, 220 and an outer face region 204, 224 separated by an offset 202, 222 respectively. In the present embodiment, the inner face region 200, 220 occupies a first plane P1 and the outer face region 204, 224 occupies a different plane P2 (see FIG. 5). The offset 202, 222 defines a step or jog in the mating face. For this reason, the illustrated mating faces 190, 192 may be considered as offset mating faces.

More specifically, mating face 190 of the first split mold insert half 116 defines (on each side of mold cavity 105) an inner face region 200, an offset 202, and an outer face region 204 (see FIG. 6). The inner face region 200 is adjacent to the mold cavity 105, and terminates partly at the shutoff face 142 and partly at the outer surface 139 of the male projecting portion 132. The outer face region 204 is on an opposite side of the offset 202 from the inner face region 200. Because the outer face region 204 of split mold insert half 116 protrudes relative to the inner face region 200, the split mold insert half 116 of FIG. 6 may be considered to define a slot or recess bounded laterally by the protruding outer face regions 204.

In the illustrated embodiment, the offset 202 has a J-shape characterized by a first, substantially straight portion 206 and a second, curved portion 208. In the present embodiment, the first portion 206 is elongate and is substantially parallel to the operational axis A of the mold stack 103, and the second, curved portion 208 diverges away from the operational axis A. The second portion 208 of the offset 202 terminates at the outer surface 139 of the male projecting portion 132. Specifically, the offset 202 terminates at a frustoconical outer surface 139 of the male projecting portion 132, between a rounded peripheral edge of the annular shutoff face 142 (at the top of the male projecting portion 132) and the flared base at the bottom of the male projecting portion 132 (where the male projecting portion 132 connects with the remainder of the split mold insert 114).

The complementary mating face 192 of the second split mold insert half 118 similarly defines (on each side of mold cavity 105) an inner face region 220 adjacent to mold cavity 105, an offset 222, and an outer face region 224 on an opposite side of the offset 222 from the inner face regions 220. The inner face region 220 terminates partly at the shutoff face 142 and partly at the outer surface 139 of male projecting portion 132. The inner face region 220 protrudes relative to the outer face region 224.

Therefore, the split mold insert half 118 may be considered to define a key (the two protruding inner face regions 220 collectively) that fits into the slot defined between the outer face regions 204 of the other split mold insert half 116.

The offset 222 in mating face 192 has a J-shape complementary to that of offset 202 of split mold insert half 116. As such, the offset 222 is characterized by a first, substantially straight portion 226 and a second, curved portion 228. The first portion 226 is elongate and is parallel to the operational axis A of the mold stack 103. The second, curved portion 228 diverges away from the axis A and terminates at the outer surface 139 of the male projecting portion 132.

Referring again to FIG. 6, it can be seen that the inner face region 220 of split mold insert half 118 includes a vent 230 near the portion of mold cavity 105 that defines the neck finish 119 (relief portion) of the preform 101. The vent 230 is intended to vent air during melt injection, with a view to decreasing the likelihood of trapped air in the relief areas of the mold cavity 105. Trapped air can result in defects in the neck finish 119 of the preform 101 and is therefore generally undesirable.

In the present embodiment, the example vent 230 has a serpentine shape, which follows the contours of the molding surface for molding the neck finish 119. The flat face of the serpentine shape is slightly recessed or indented relative to the remainder of inner face region 220. The degree of indentation is deliberately chosen so that, when the inner face region 220 is mated, in a molding configuration, with flat complementary inner face region 200 of the other split mold insert half 116 (e.g. as in FIGS. 4 and 5), the vent 230 defines a gap that permits air, but not melt (in any substantial amount), to pass therethrough. It will be appreciated that the width of the gap that is suitable for causing vent 230 to vent air while blocking melt may depend upon the properties of the melt to be used in mold stack 103. For example, in the case where the molding material to be used is PET, the gap may be in the range of 30-40 microns.

An air collector groove 232 is disposed adjacent to vent 230 (FIG. 6). Air collector groove 232 collects air vented from the mold cavity via vent 230. The air collector groove 232 of the present embodiment is recessed or indented relative to the remainder of inner face region 220 to an even greater extent than vent 230. This indentation facilitates egress of air from molding cavity 105 via vent 230. The air collector groove 232 aligns with another groove 234 in the outer face region 204 of the complementary mating face 190, which channels air towards an outlet for venting to the atmosphere.

As should now be apparent from the foregoing description, when the mated halves of the tapered male portion 132 of split mold insert 114 are fully seated within the tapered female receptacle 130 (e.g. as shown in FIG. 3) and an axial clamping force is applied to the mold stack 103, the split mold insert halves 116, 118 are held together in the molding configuration despite the exertion of an opposing outward force pressurized melt within the neck finish area of the molding cavity 105. When the cavity insert 106 and the split mold insert 114 are in the molding configuration of FIG. 3, their respective shutoff faces 133 and 142 define a parting line between the cavity insert 106 and the split mold insert 114. The term "parting line" as used herein refers to a junction between two mold stack components that prevents melt from passing therethrough and, unlike a vent, is not intended or otherwise relied upon to vent gas therethrough.

When the mold 100 is operated over multiple molding cycles, residue may accumulate within the vent 230 defined between the split mold insert halves 116, 118. The residue may for example be made up of molding material dust, contaminants or other particles. In traditional molding systems, removal of vent residue may be performed by taking the molding system out of operation, opening the mold stacks and manually scraping and/or cleaning the affected vent surfaces. A possible disadvantage of such an approach is the corresponding loss of production capacity and the manual labor involved and significant risk of damaging the mold.

To avoid the need for such traditional cleaning, the example mold stack 103 is configurable between the standard molding configuration, discussed above, and a vent-cleaning (or simply "cleaning") configuration. In the cleaning configuration, mold stack surfaces that normally cooperate to define vents therebetween are slightly separated from one another to allow melt to enter therebetween. Put another way, vents to be cleaned are reconfigured to become extensions of the molding cavity. When a molding cycle is performed with the mold stack in the cleaning configuration, melt from the molding cavity enters the widened vents as "intentional flashing." Residue within the vents adheres to, or becomes incorporated with, the flashing and may thus be removed when the molded article, complete with integral flashing, is ejected from the molding cavity. Such cleaning cycles may be scheduled to occur as needed, e.g. at predetermined time intervals, after a predetermined number of molding cycles, or on demand.

Figure 7:
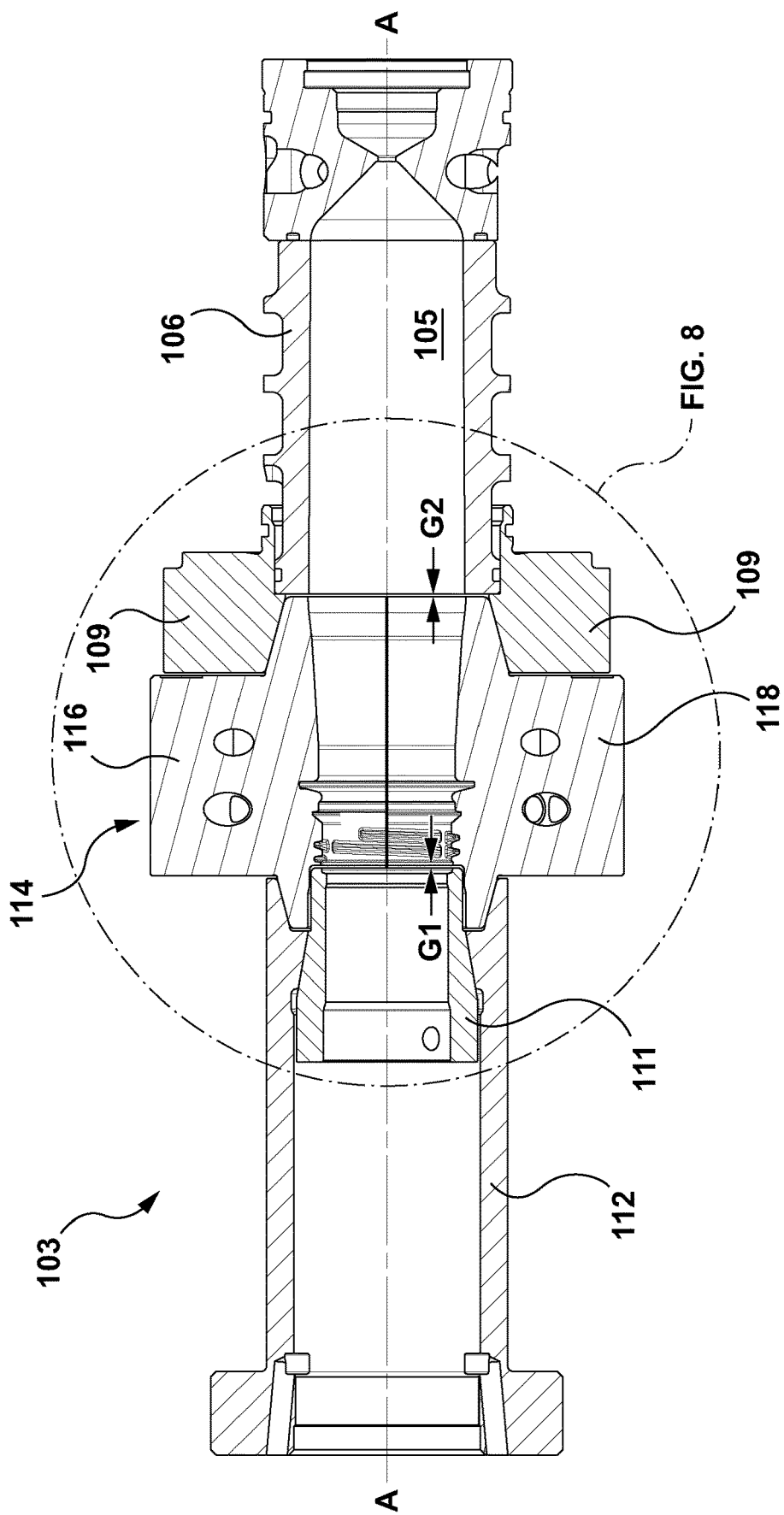
FIG. 7 is a cross-sectional view of the same portion of the mold as shown in FIG. 1 but with the mold stack in a cleaning configuration and with a core insert element being removed for clarity.
Figure 8:
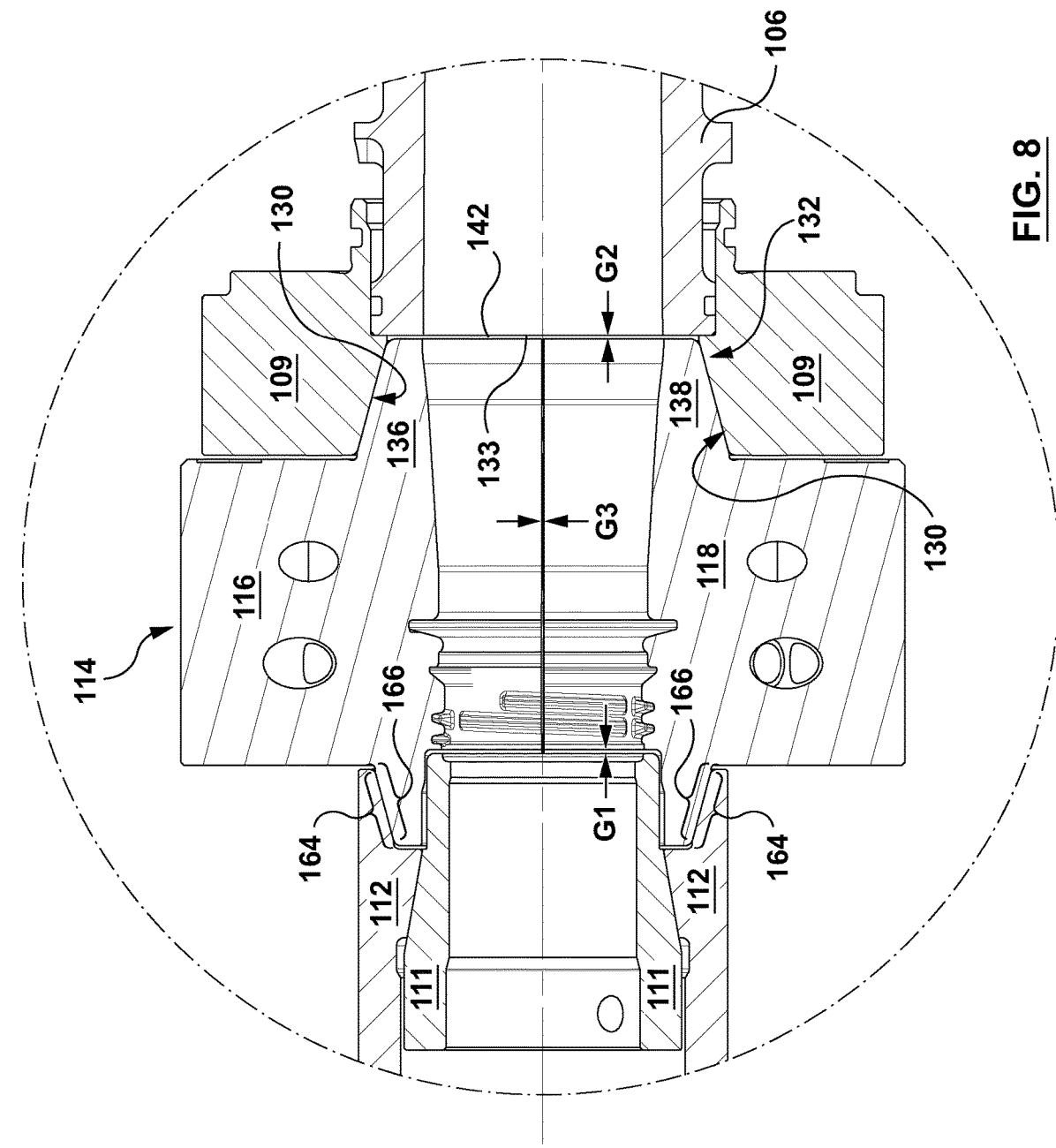
FIG. 8 is a close up view of a portion of the cross-sectional view of FIG. 7.
Figure 9:
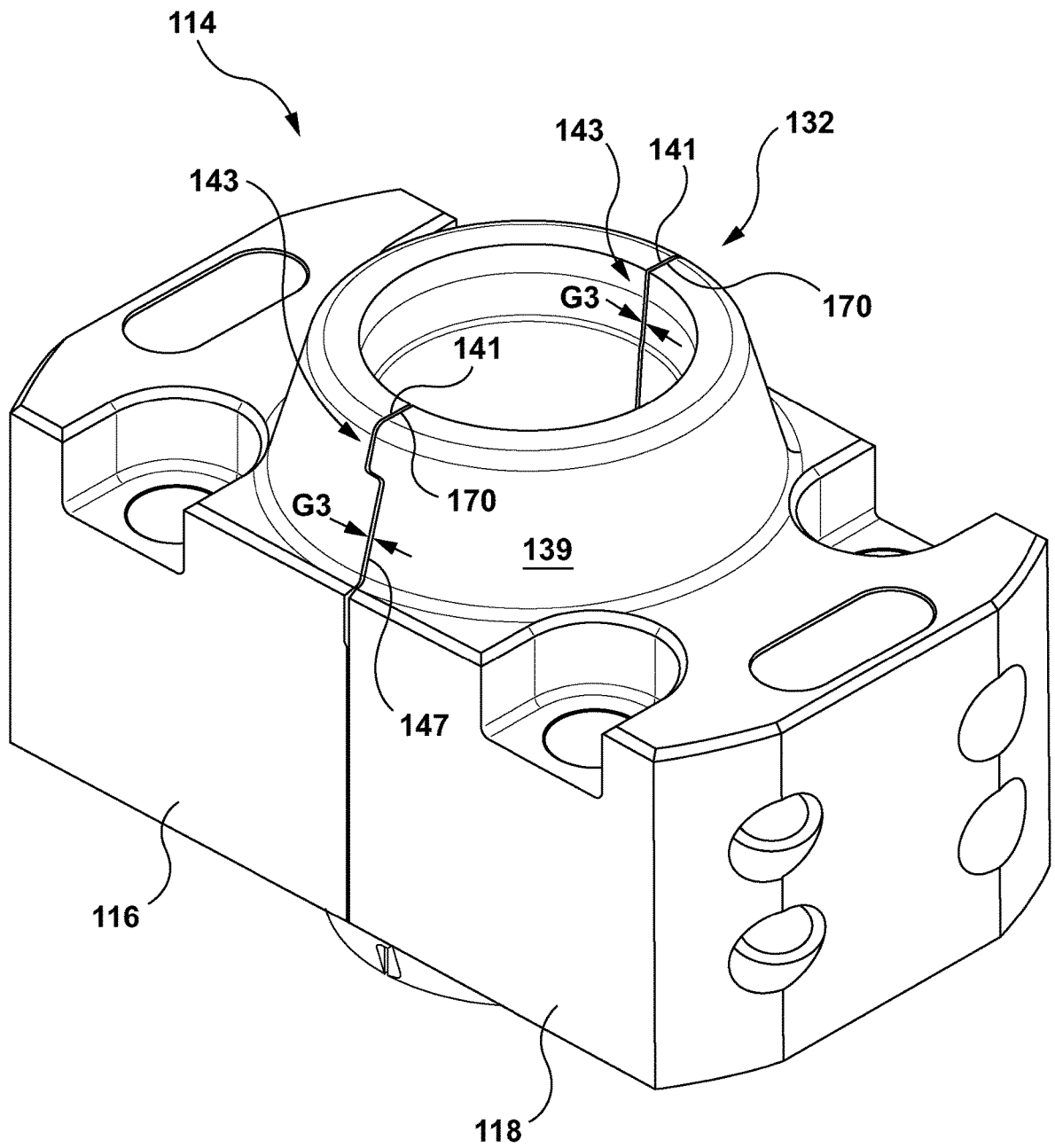
FIGS. 9 and 10 are a perspective view and plan view, respectively, of the split mold insert component of FIGS. 7 and 8 in a cleaning configuration.
Figure 10:
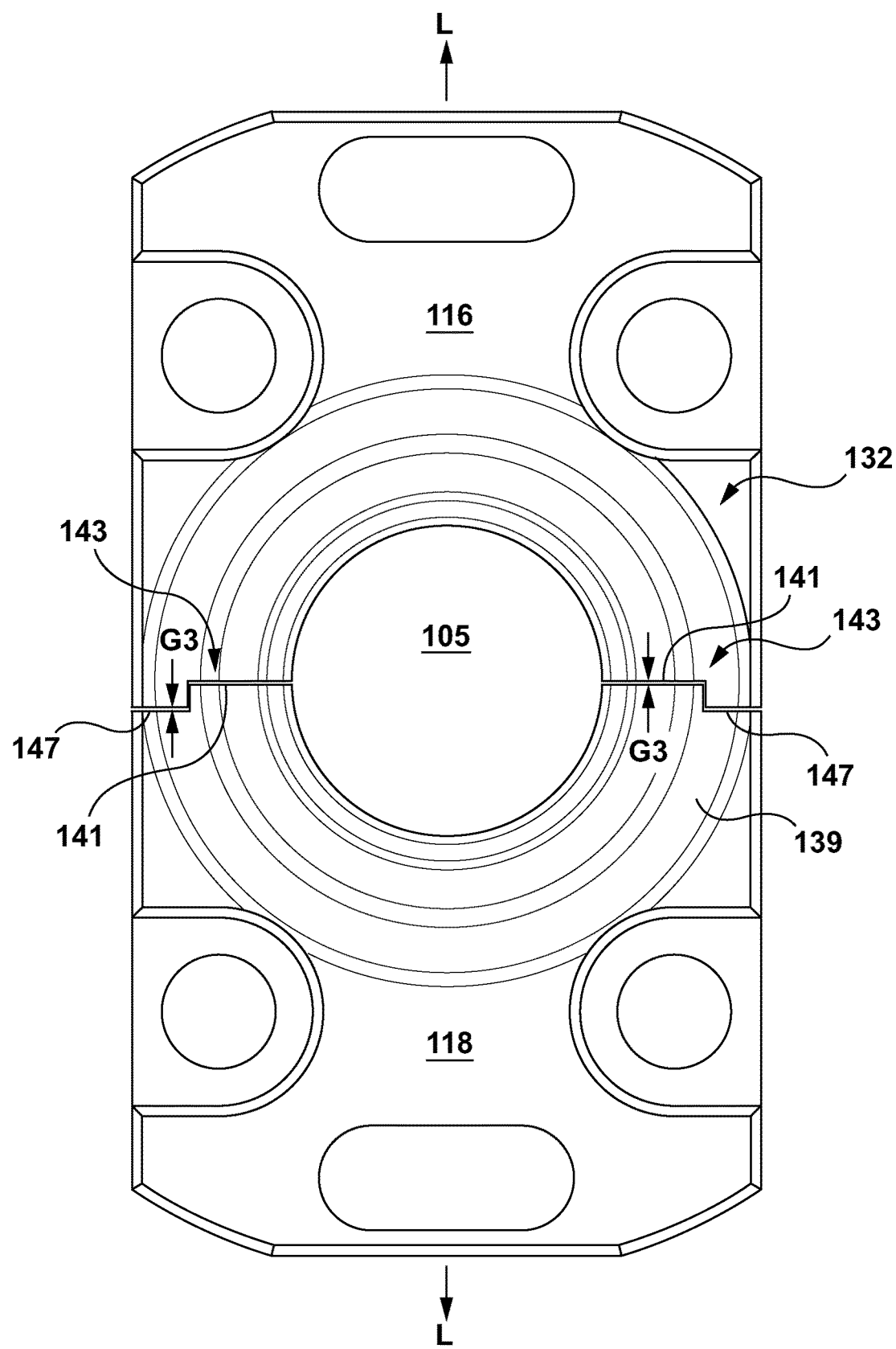
Figure 11:
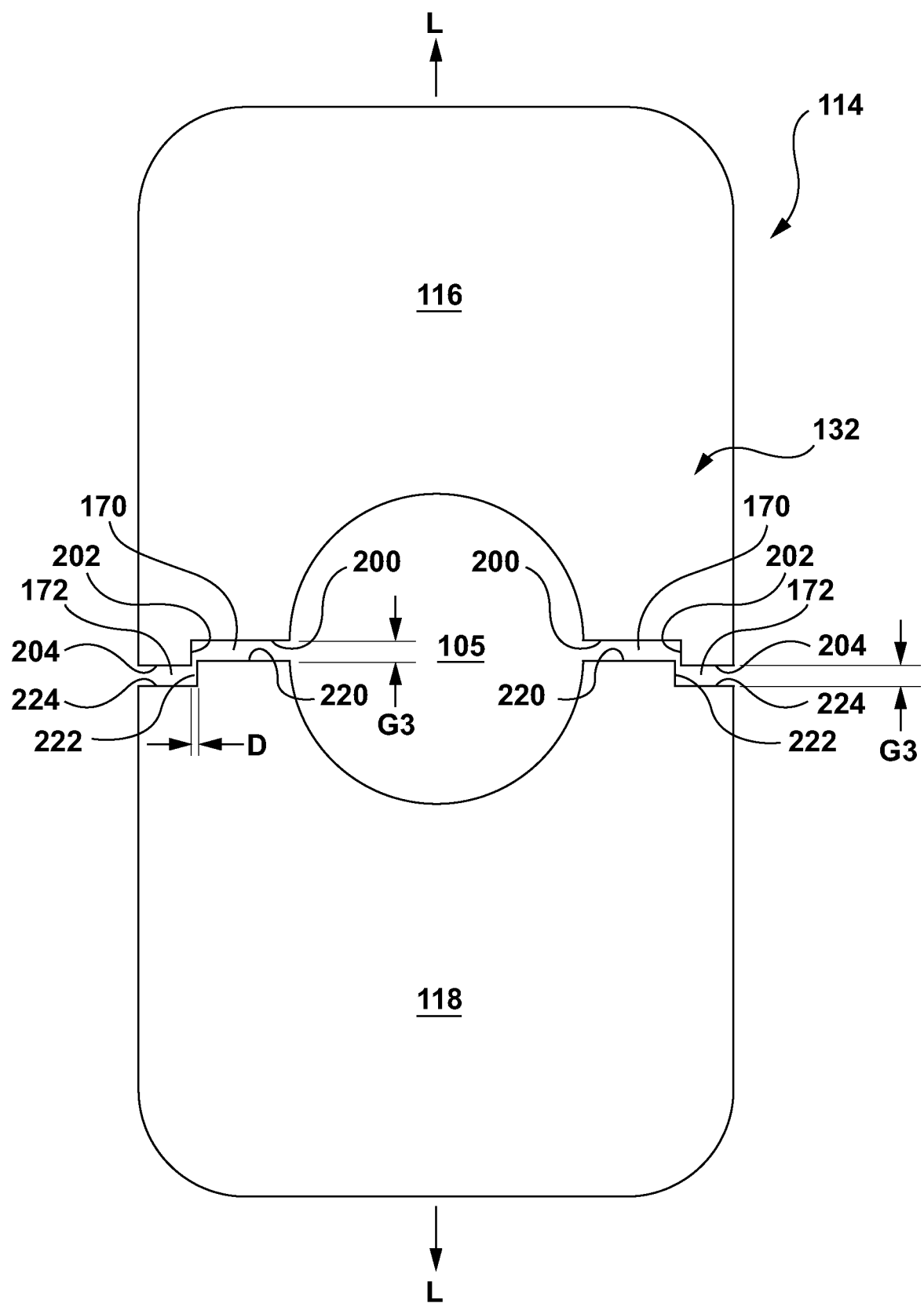
FIG. 11 is a schematic diagram illustrating a simplified version of the split mold insert of FIG. 10 in plan view.

FIGS. 7-11 illustrate the example mold stack 103, or components thereof, in a cleaning configuration. More specifically, FIG. 7 is a cross-sectional elevation view of the mold stack 103 similar to that of FIG. 1 but in a cleaning configuration, with the core insert 110 omitted for better visibility of split mold insert 114. FIG. 8 provides a close-up cross-sectional elevation view, similar to FIG. 3, of a portion of mold stack 103 illustrating interaction between the split mold insert 114, cavity flange 109 and cavity insert 106 when in the cleaning configuration. FIGS. 9 and 10 illustrate split mold insert 114 in the cleaning configuration in perspective view and plan view, respectively, in isolation from other mold stack components. FIG. 11 schematically depicts the split mold insert 114 of FIG. 10 in the cleaning configuration using a simplified representation wherein certain features (e.g. gaps) are exaggerated for improved comprehensibility.

Referring to FIGS. 7 and 8, it can be seen that the mold stack 103 depicted therein differs from the one depicted in FIGS. 1 and 3 in that gaps G1 and G2 have been introduced on opposite sides of the split mold insert 114. The first gap G1 is between the split mold insert 114 and the core ring 111. The second gap G2 is between the split mold insert 114 and the cavity insert 106. The gaps may be introduced by a shut height adjustment mechanism associated with the mold 100 (not depicted).

Referring to the more detailed view of FIG. 8, it can be seen that the gap G2 is formed between the shutoff face 133 of cavity insert 106 and shutoff face 142 of split mold insert 114. The extent of gap G2 is sufficient for melt to enter between the shutoff faces 133, 142. As such, in the cleaning configuration of mold stack 103 that is depicted in FIG. 8, the gap G2 acts as an extension of the mold cavity 105, with the shutoff faces 133, 142 accordingly behaving as molding surfaces.

In view of the presence of gaps G1 and G2 on either side of split mold insert 114, i.e. in view of the partial withdrawal of the tapered male portion 132 from the tapered female receptacle 130 and/or the partial withdrawal of the opposing tapered male portion 164 from the tapered female receptacle 166 of lock ring 112, the split mold insert halves 116, 118 are free to separate laterally (vertically in FIG. 8) to a limited extent to form a gap G3 between their mating faces 190, 192. Separation may for example be responsive to an injection of pressurized melt into the mold cavity 105. The tapered female receptacle 130 of cavity flange 109 may limit the degree of separating of the split mold insert halves 116, 118 by limiting a degree of separating of the associated halves 136, 138 of the tapered male portion 132 (see FIG. 8).

Referring to FIGS. 9 and 10, it may be considered that the proximal portion 141 of split line 143 between the split mold insert halves 116, 118 has widened to form gap G3 and that the distal portion 147 of split line 143 has similarly widened to form gap G3.

FIG. 11 provides a simplified schematic view of the split mold insert 114, in the cleaning configuration, in the same general view and orientation as FIG. 10. FIG. 11 is intended to promote a better understanding of how the various features of complementary mating faces 190, 192 of split mold insert halves 116, 118 respectively interact when the split mold insert 114 is in the cleaning configuration. It will be appreciated that the dimensions of FIG. 11 are not to scale and that some features (e.g. gap sizes) are exaggerated to facilitate comprehension.

As illustrated, when the split mold insert half 114 is in the cleaning configuration, complementary (opposing) inner face regions 200, 220 are separated to form proximal gap G3. The extent of gap G3 is intentionally set, e.g. through suitable dimensioning of gaps G1 and/or G2 using a shut height adjustment mechanism, to be wide enough to allow melt to flow therein. As such, the separated inner face regions 200, 220 of mating faces 190, 192 respectively define an extension 170 of the molding cavity 105 on opposite side of the cavity 105.

As also shown in FIG. 11, complementary (opposing) outer face region 204, 224 are separated by the same extent (G3) as the inner face regions 200, 220 when the split mold insert half 114 is in the cleaning configuration. The resultant distal gap 172 is unbounded at a periphery of split mold insert 114 (FIG. 10), presenting a risk that any melt entering the distal gap may flash uncontrollably from the split mold insert 114. Possible disadvantages of uncontrolled flashing from distal gap 172 may include: wastage of melted molding material; increased risk of fouling mold stack areas that should be clean for proper mold operation; and increased risk of "daisy chaining" of adjacent molded articles (whereby flashing from adjacent mold stacks merges and causes adjacent preforms, which are intended to be formed as discrete articles, to unintentionally become connected in rows or chains).

To prevent melt from the proximal mold cavity extension 170 from flowing into the distal gap 172, the offsets 202, 222 cooperate to form a melt barrier or "fence." Because the offsets 202, 222 are parallel, rather than orthogonal, to the separation dimension L (see FIG. 11), separation of the split mold insert halves 116, 118 into their cleaning configuration does not cause complementary offsets 202, 222 to separate like the inner and outer face regions 200, 220 and 204, 224. Instead, the offsets 202, 222 slide relative to one another, with no change in their separation distance D. The substantially constant separation distance D between the offsets 202, 222 (i.e. between the molding and cleaning configurations) is such that melt flow from mold cavity extension 170 into distal gap 172 is prevented. In some embodiments, suitable dimensioning of separation distance D may allow air, but not melt, to pass between offsets 202, 222, so that the offsets collectively define vents on either side of mold cavity 105 over their entire lengths. However, this is not absolutely required.

Figure 12:
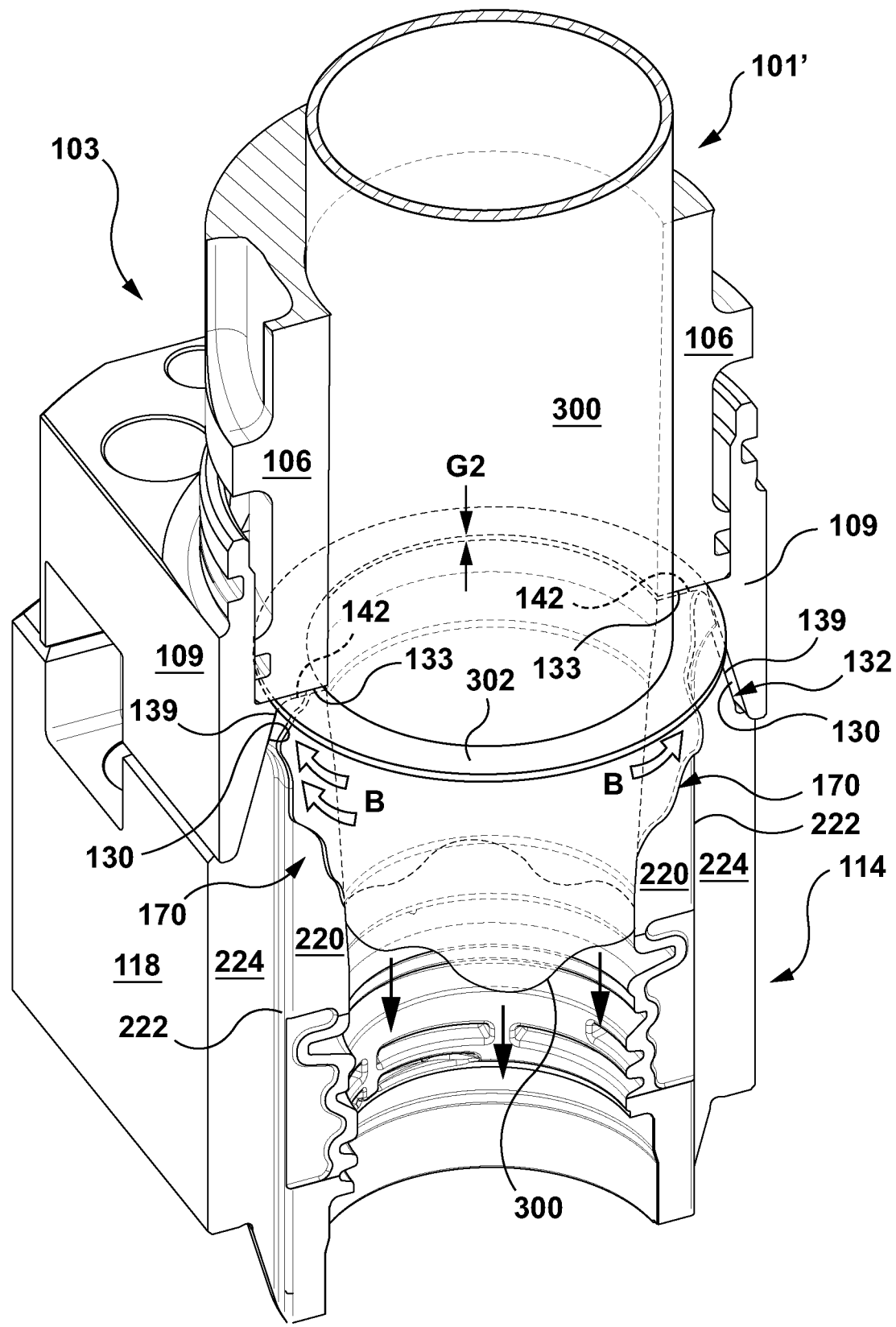
FIGS. 12 and 13 are partial transverse cross sections of the mold stack of FIG. 7 at two different stages of molding operation.
Figure 13:
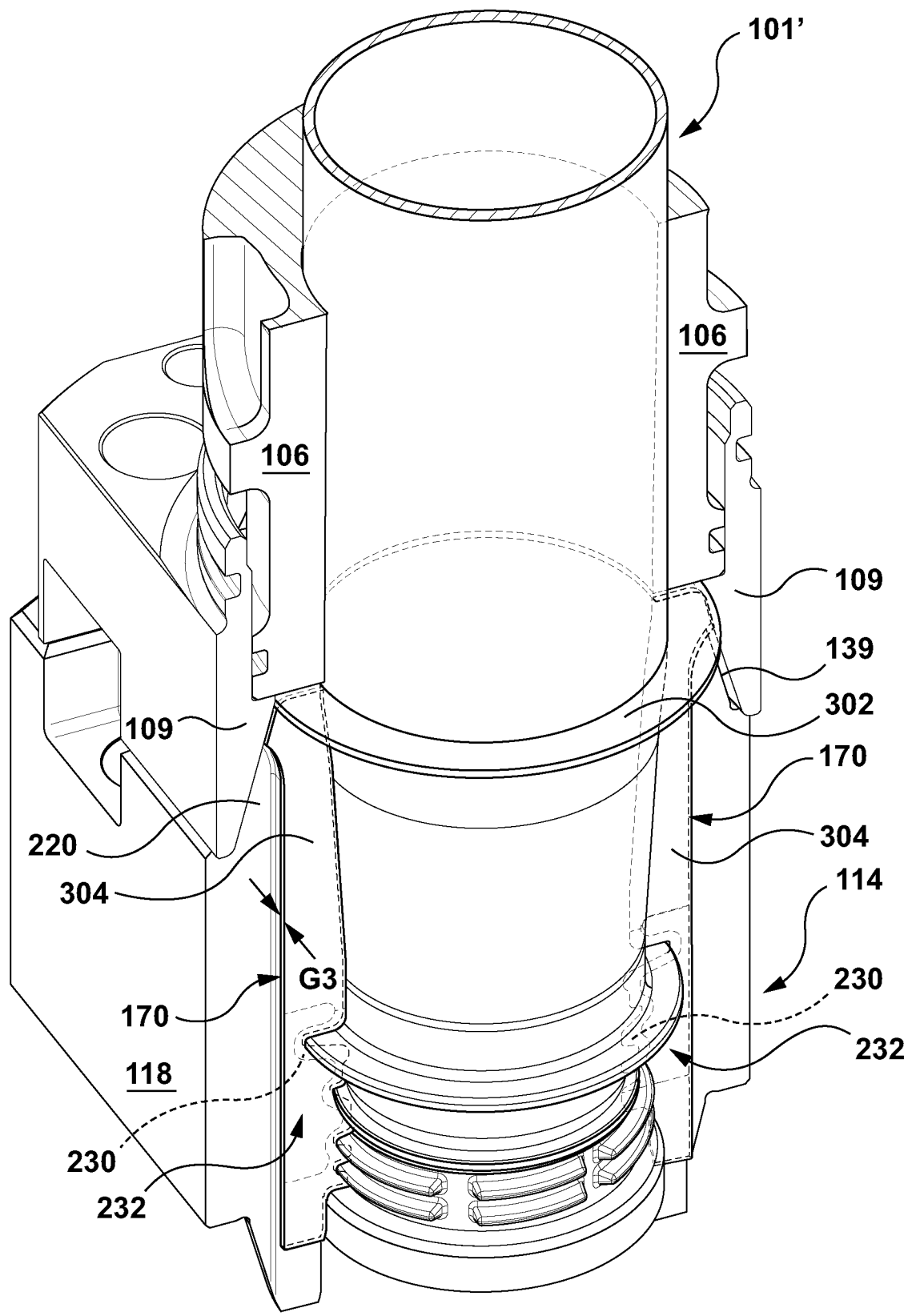

FIGS. 12 and 13 illustrate two stages of injection molding a preform 101' (i.e. preform 101 plus intentional flashing) using the mold stack 103 in the cleaning configuration. FIGS. 12 and 13 show three components of mold stack 103: cavity insert 106, cavity flange 109, and split mold insert half 118. The first two components are illustrated in transverse cross section, with only the lower portion to of cavity insert 106 being visible. The latter component, i.e. split mold insert half 118, is shown in full but without the complementary split mold insert half 116. Core insert 110 is omitted for clarity.

At a first stage of molding depicted in FIG. 12, inflowing melt 300, which flows from the top down in FIG. 12, has filled the cylindrical upper portion of mold cavity 105 in the area of cavity insert 106. The melt 300 has further entered into the annular gap G2 formed between the downwardly facing annular shutoff face 133 of cavity insert 106 and the upwardly facing annular shutoff face 142 of split mold insert half 118. The gap G2 is peripherally bounded by the tapered female receptacle 130 of cavity flange 109 (see also FIG. 8). The outer surface 139 of the male projecting portion 132 cooperates with the tapered female receptacle 130 to provide a melt barrier at an underside of a periphery of annular gap G2 (see FIG. 12). As such, further radial melt flow is precluded. The melt within gap G2 accordingly forms an annular flange 302 that extends from, and is integral with, preform 101'.

Below flange 302, the melt 300 has continued to flow downwardly within split mold insert 114 (of which only split mold insert half 118 is visible in FIG. 12). Due to the separation of the split mold insert halves 116, 118 as depicted in FIGS. 7-11, some melt 300 has begun to flow laterally into the mold cavity extension 170 defined between the inner face region 220 of split mold insert half 118 and the inner face region 200 of split mold insert half 116 (see FIG. 11).

When the melt within mold cavity extension 170 reaches the "fence" formed by the interface between offset 202 of split mold insert half 116 (see, e.g., FIG. 11) and offset 222 of split mold insert half 118, the interface acts as a fence, blocking melt from flowing between the offsets 202, 222. Instead, the melt may be guided towards the melt barrier collectively formed by the outside surface 139 of male projecting portion 132 and the tapered female seat 130 of cavity flange 109, as depicted by arrows B in FIG. 12.

At a second stage of molding depicted in FIG. 13, the preform 101' is fully formed. The mold cavity extension 170 between inner face regions 200 and 220, on either side of mold cavity 105, has been entirely filled with melt, forming wings 304 (intentional flashing) whose thickness is determined by the width of gap G3. The wings 304 are integral with annular flange 302, in the present embodiment, and are flared outwardly at their upper ends. The flaring is due to the outward divergence of offsets 202, 222 away from mold cavity 105 and towards the outer surface 139 of the male projecting portion 132.

Figure 14:
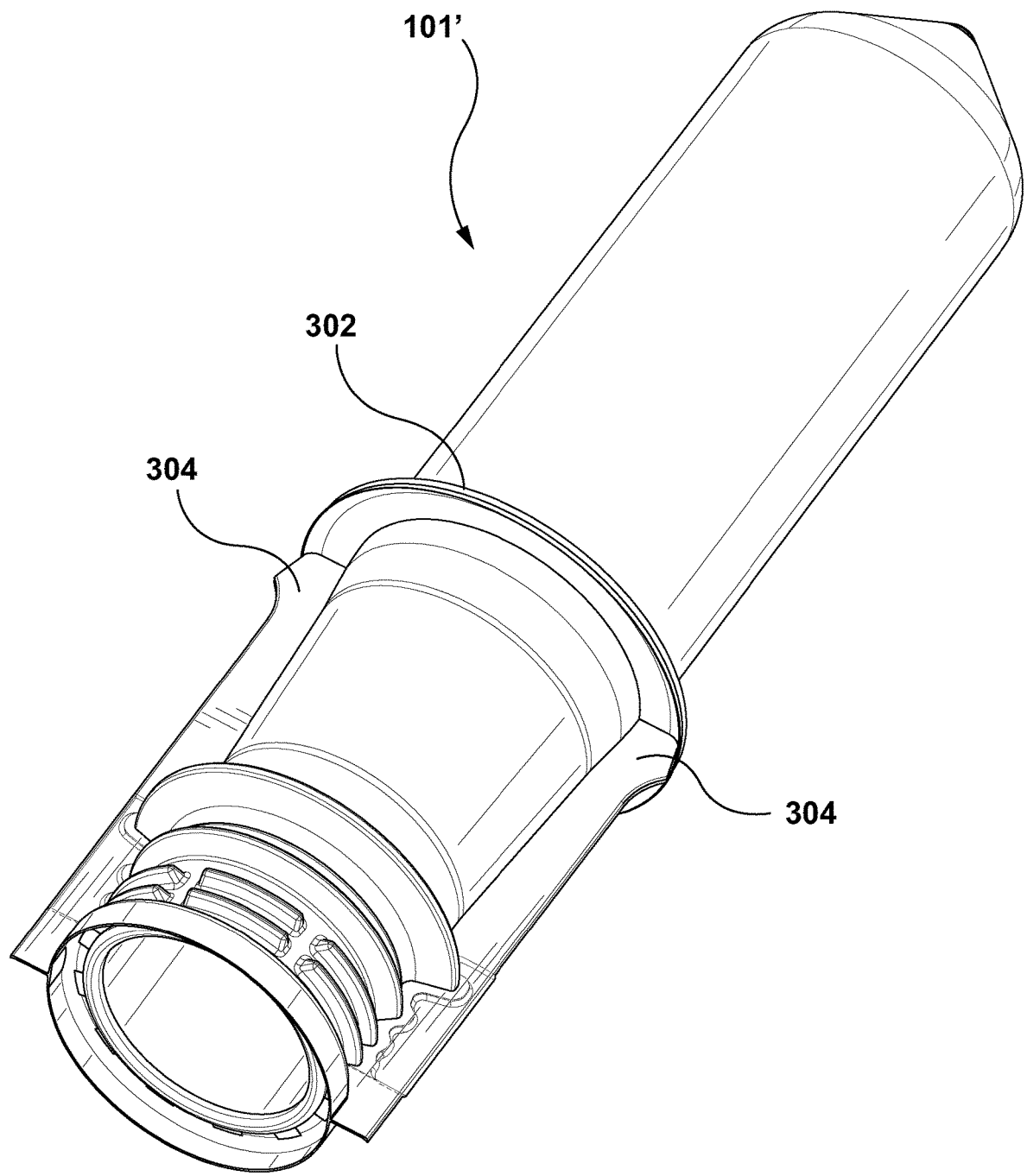
FIG. 14 is a perspective view of a molded article that may be molded by the mold stack of FIG. 7 in the cleaning configuration.

Any residue that may have accumulated upon vents 230 may be incorporated into wings 304 for removal upon ejection of preform 101'. A vent-cleaning purpose may thereby be achieved. Upon its ejection, the preform 101' may have the appearance shown in the perspective view of FIG. 14. For clarity, relief features resulting from vent 230 and groove 232, which relief features are disposed on an underside of wings 304 as they appear in FIG. 14, may be visible from the opposite side of the wings 304 in FIG. 14 in view of a translucency of the molding material from the example preform 101' is made.

Figure 15:
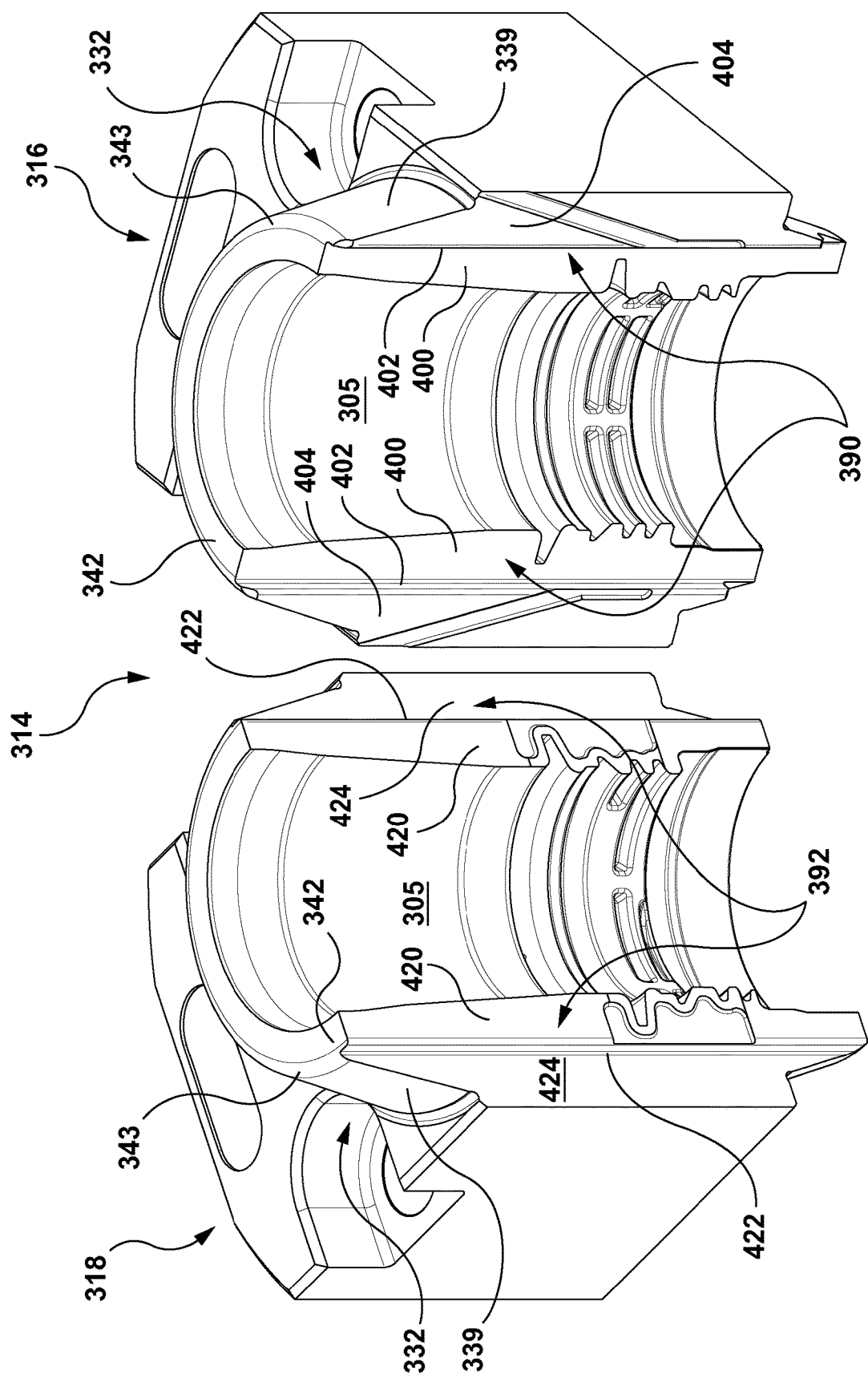
FIG. 15 is a perspective view of an alternative split mold insert separated into its two component halves with their respective mating faces visible.

To illustrate the sort of uncontrolled flashing that can be avoided by the above-described configuration of mating faces 190, 192 of the split mold insert 114, an alternative embodiment of split mold insert 314 is depicted in FIG. 15 in a similar perspective view to what is provided in FIG. 6.

The split mold insert 314 illustrated in FIG. 15 is, in most respects, similar to the split mold insert 114 described above. The split mold insert 314 is split into two halves 316, 318, each having a respective offset mating face 390, 392. The mating faces 390, 392 are complementary.

The mating face 390 of first split mold insert half 316 defines, on each side of mold cavity 305, an inner face region 400, an offset 402, and an outer face region 404. The inner face region 400 is adjacent to the mold cavity 305 and terminates partly at the shutoff face 342 and partly at a rounded transition region 343 adjacent to the shutoff face 342. The outer face region 404 is on an opposite side of the offset 402 from the inner face region 400 and terminates partly at the outer surface 339 of male projecting portion 332 and partly at a rounded peripheral edge 343 adjacent of the shutoff face 342. The outer face regions 404 protrude relative to the inner face regions 400.

The complementary mating face 392 of the second split mold insert half 318 similarly defines, on each side of mold cavity 305, an inner face region 420 adjacent to mold cavity 305, an offset 422, and an outer face region 424 on an opposite side of the offset 422 from the inner face region 420.

Figure 16:
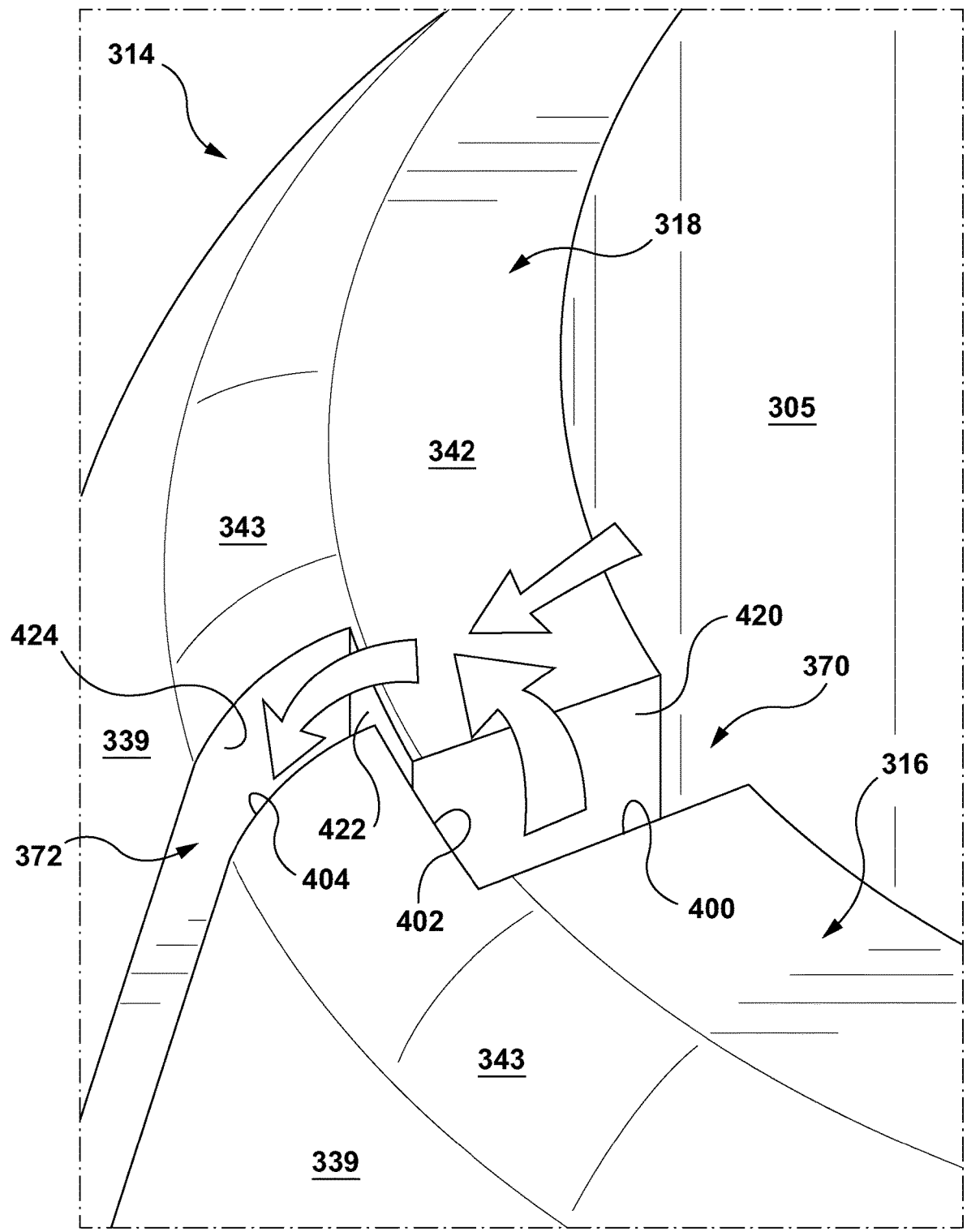
FIG. 16 is a close-up perspective view of a portion of the split mold insert of FIG. 15 in a cleaning configuration illustrating a possible uncontrolled flashing problem.

Notably, the offsets 402, 422 of the present embodiment of split mold insert are substantially straight, terminating at the transition area 343 between shutoff face 342 and outer surface 339, rather than at the outer surface 339 of the male projecting portion 332 (see FIG. 15; see also the perspective close-up view of the split mold insert 314 of FIG. 16). As a result, it is possible for melt from mold cavity 305 or from mold cavity extension 370 (i.e. the gap formed between opposing inner face regions 400, 420 when the split mold insert 314 is in the cleaning configuration) to flow out onto shutoff face 342 and into distal gap 372 (i.e. the gap formed between opposing outer face region 404, 424 when the split mold insert 314 is in the cleaning configuration). Put another way, because the offsets 402, 422 terminate within transition area 343 rather than in an outer surface 339 of the male projecting portion 332, the innermost extent of the distal gap 372 is open to the influx of melt from the gap between shutoff face 342 and the shutoff face of the adjacent cavity insert (not depicted). This is in contrast to the earlier-described embodiment, wherein the distal gap 172 terminates fully in the outer surface 139 of the male projecting portion 132, with the result that melt is blocked from entering the distal gap 172 (see e.g. FIG. 11).

Figure 17:
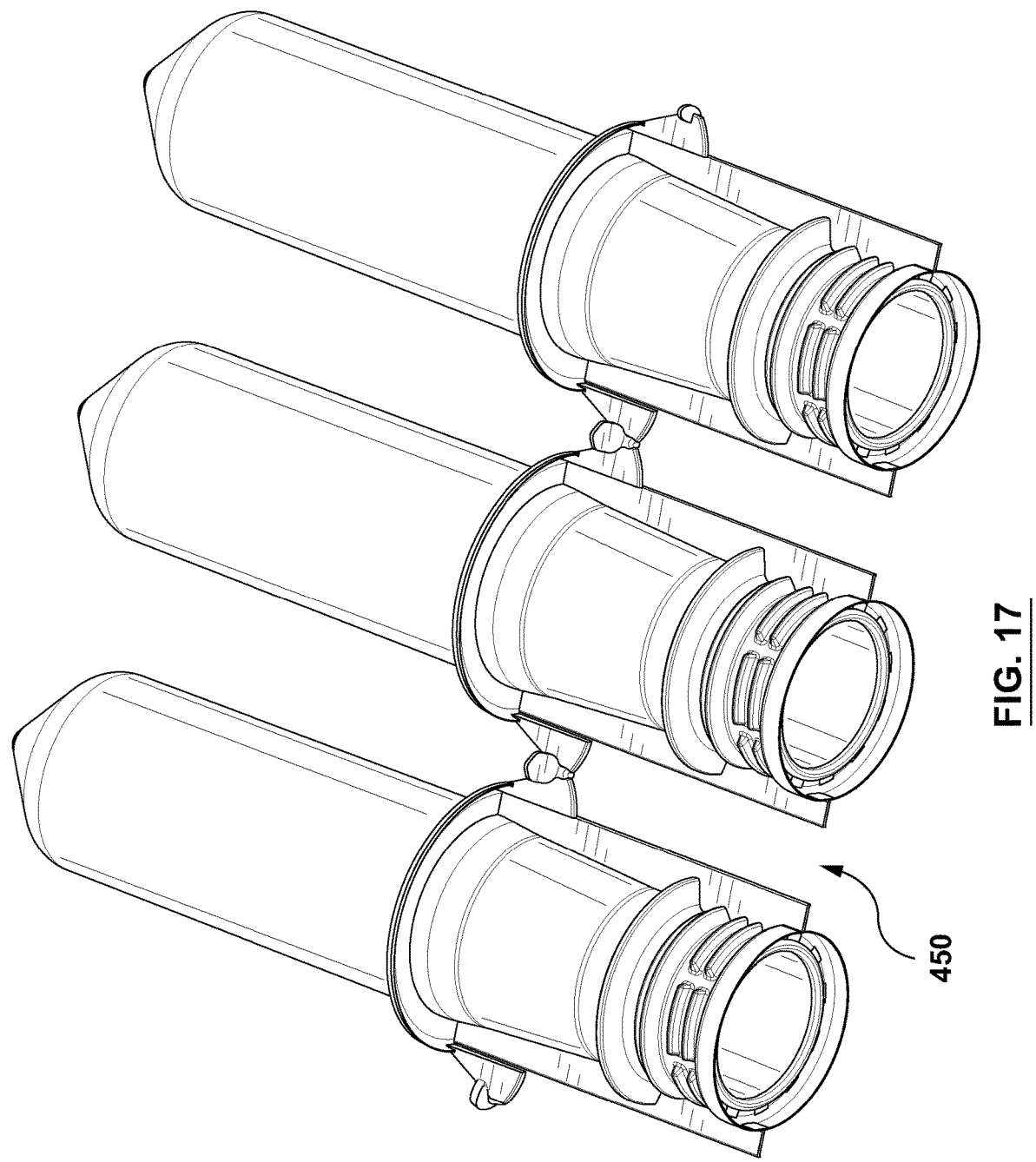
FIG. 17 is a perspective view of a row of molded articles that may result if uncontrolled flashing occurs in split mold inserts of adjacent mold stacks.

Thus, use of a split mold insert 314 of FIG. 16 in a mold stack 103, instead of the split mold insert 114 described above, could disadvantageously result in uncontrolled flashing into distal gaps 372 when the split mold inserts are in the vent-cleaning configuration. When many mold stacks 103 are tightly arranged in a multi-stack mold, the result may be a daisy chaining of adjacent preforms into an array 450 of interconnected preforms, as depicted in the perspective view of FIG. 17 for example. This potential risk may not be well-appreciated by the person of ordinary skill, e.g. because vent-cleaning configurations of split mold inserts are relatively new to the industry and/or because vent cleaning may be performed relatively infrequently. Disadvantages of daisy chaining may include the unexpected interruption of the molding cycle, resulting from cleaning parts that cannot be fully ejected, or the partial ejection of cleaning parts, fooling the machine's part detection sensors, allowing the mold to close with parts of the molded article remaining between the split mold inserts or other areas in and around them, and resulting in fouled mold stacks or other mold areas that should be clean for proper mold operation. Other risks include inadvertent "flashing" of molded articles 101 during normal (production) molding cycles if stacks or mold components are held open in part by trapped plastic, or excessive localized loading which could damage any one of a number of mold components, including the stacks.

Various alternative embodiments are possible.

In the split mold insert 114 of FIGS. 1 and 3-13, the offsets 202, 222 in the complementary mating faces 190, 192 are J-shaped (see e.g. FIG. 6). It will be appreciated that the offsets of other split mold insert embodiments may have other shapes.

Figure 18:
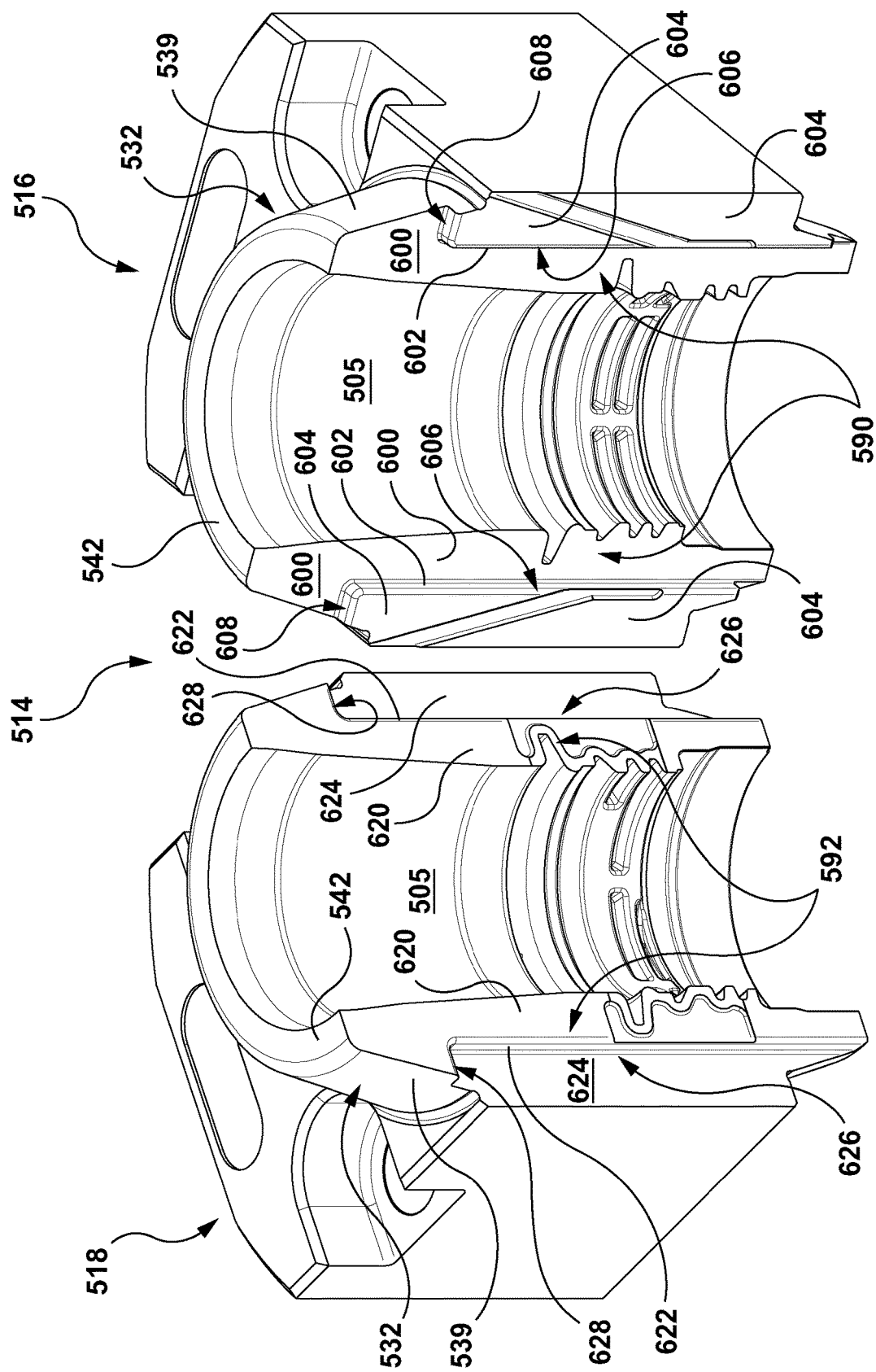
FIG. 18 is a perspective view of an alternative embodiment of split mold insert separated into its two component halves with their respective mating faces visible.

For example, FIG. 18 shows an alternative embodiment of split mold insert 514 in which the offsets are substantially L-shaped. The split mold insert may for example be substitutable for split mold insert 114 in mold stack 103.

In FIG. 18, the split mold insert 514 is shown in perspective view, with the two halves 516, 518 oriented so that their respective mating faces 590, 592 are visible. The mating face 590 of first split mold insert half 516 defines, on each side of mold cavity 505, an inner face region 600, an offset 602, and an outer face region 604. The inner face region 600 is adjacent to the mold cavity 505 and terminates partly at the shutoff face 542 and partly at the outer surface 539 of tapered male projecting portion 532. The outer face region 604 is on an opposite side of the offset 602 from the inner face region 600 and terminates (at least in part) at the outer surface 539 of male projecting portion 532. The outer face regions 604 protrude relative to the inner face regions 600.

The complementary mating face 592 of the second split mold insert half 518 similarly defines, on each side of mold cavity 505, an inner face region 620 adjacent to mold cavity 505, an offset 622, and an outer face region 624 on an opposite side of the offset 622 from the inner face region 620.

Notably, each of the offsets 602, 622 of the present embodiment has an L-shape characterized by a first, longer straight portion 606, 626 and a second, shorter straight portion 608, 628 extending orthogonally from the longer portion 606. In the present embodiment, the first portion 606 is substantially parallel to the operational axis A of the mold stack 103, which extends through the middle of the mold cavity 505 (in a similar manner as axis A extends through mold cavity 105 of FIG. 6). The second portion 608, 628 of the offset 602, 622 is substantially orthogonal to the axis A (substantially parallel to shutoff face 542) and terminates at the outer surface 539 of the male projecting portion 532.

Figure 19:
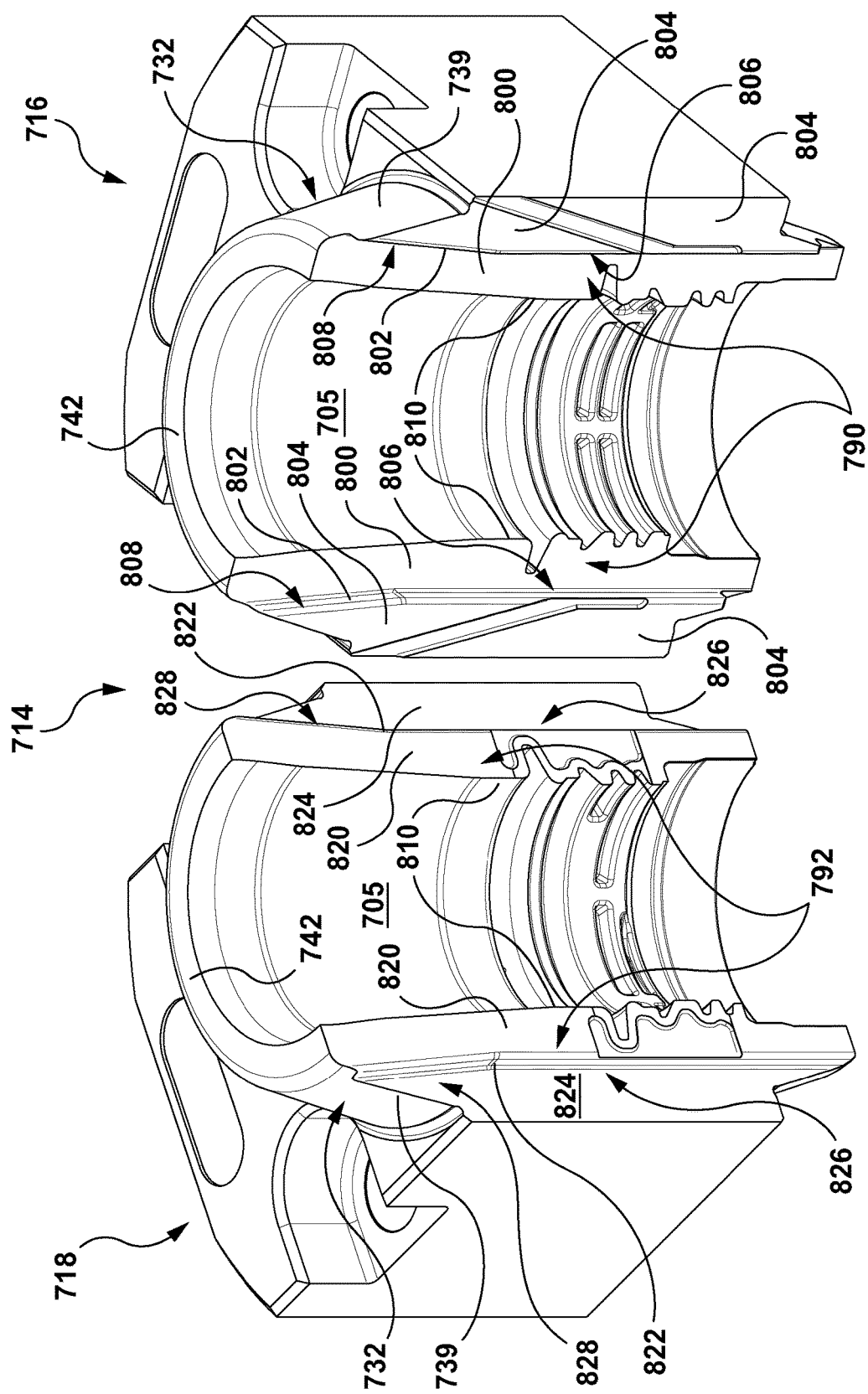
FIG. 19 is a perspective view of another alternative embodiment of split mold insert separated into its two component halves with their respective mating faces visible.

FIG. 19 shows a further alternative embodiment of split mold insert 714 in which portions of the offsets are slightly bent at an obtuse angle of about 170 degrees. The split mold insert 714 may similarly be substitutable for split mold insert 114 in mold stack 103.

In FIG. 19, the split mold insert 714 is shown in perspective view, with the two halves 716, 718 oriented so that their respective mating faces 790, 792 are visible. The mating face 790 of first split mold insert half 716 defines, on each side of mold cavity 705, an inner face region 800, an offset 802, and an outer face region 804. The inner face region 800 is adjacent to the mold cavity 705 and terminates partly at the shutoff face 742 and partly at the outer surface 739 of tapered male projecting portion 732. The outer face region 804 is on an opposite side of the offset 802 from the inner face region 800 and terminates (at least in part) at the outer surface 739 of male projecting portion 732. The outer face regions 804 protrude relative to the inner face regions 800.

The complementary mating face 792 of the second split mold insert half 718 similarly defines, on each side of mold cavity 705, an inner face region 820 adjacent to mold cavity 705, an offset 822, and an outer face region 824 on an opposite side of the offset 822 from the inner face region 820.

Notably, each of the offsets 802, 822 of the present embodiment is characterized by a first, longer straight portion 806, 826 and a second, shorter straight portion 808, 828 extending at an obtuse angle from the longer portion 806, 826 respectively. In the present embodiment, each portion 806, 826 and 808, 828 is substantially parallel to the portion of molding surface 810 of the molding cavity 705 to which it is adjacent (the upper portion of the mold cavity 705 being slightly outwardly flared in the present embodiment). The portions 808, 828 may also be substantially parallel to the operational axis A of the mold stack 103. The second portion 806, 826 of the offset 802, 822 terminates at the outer surface 739 of the male projecting portion 732. It will be appreciated that the portion 806, 826 of offsets 802, 822 does not necessarily have to be longer than the portion 808, 828 respectively. The former could be of equal length or shorter than the latter in alternative embodiments.

The behavior of the split mold inserts 514, 714 of FIGS. 18 and 19 for preventing uncontrolled flashing within the distal gap formed between outer face regions 604, 624 and 804, 824 is analogous to that of split mold insert 114. In particular, the outer surface 539, 739 of the male projecting portion 532, 732 cooperates with the tapered female receptacle 130 of cavity flange 109 to provide a melt barrier. When melt between opposing inner face regions 600, 620 and 800, 820 of the split mold insert halves 516, 518 and 716, 718 reaches the "fence" formed by the interface between offsets 602, 622 and 802, 822 of split mold insert halves 516, 518 and 716, 718 respectively, the interface acts as a fence, blocking any melt from flowing between the offsets 602, 622 and 802, 822. Instead, the melt may be guided towards the melt barrier.

As noted above, the example split mold insert 114 of FIGS. 1 and 3-13 is designed for use in core lock type mold stack 103. It will be appreciated that similar split mold inserts could be used with other mold stacks types, such as cavity lock type mold stacks (i.e. the split insert has a female taper on the bottom thereof), to mitigate the above-described type of uncontrolled flashing.

The foregoing examples depict molding of articles that are preforms. It will be appreciated that similar techniques could be used for molding other articles having a relief portion, such as thin-wall container molds. The relief portion could for example be a container closure having tamper evidence bands with molded bridges.

Although each of the above split mold inserts is depicted as being split into two halves, alternative embodiments of split mold insert may be split into a larger number of parts separable for molded article ejection.

In the example split mold inserts 114, 514 and 714 described above, each of the inner face regions 200, 220, 600, 620 and 800, 820 occupies a first plane (e.g. plane P1 in the case of split mold insert 114) and each of the outer face regions 204, 224, 604, 624 and 804, 824 occupied a different plane (e.g. plane P2 in the case of split mold insert 114—see FIG. 5). It will be appreciated that, in some embodiments, the inner and outer face regions of split mold insert part could occupy the same plane. In such embodiments, one offset (e.g. offset 202, 602 and 802) could be a tongue and the complementary offset (e.g. offset 122, 622 and 822) could be a groove.

The male projecting portions of the split mold insert embodiments disclosed herein are frustoconical. In alternative embodiments, the male projecting portions could have other shapes. Tapered shapes may facilitate alignment of the split mold insert with adjacent mold stack components having corresponding female receptacles. However, it is possible that the shape of some male projecting portion embodiments could be non-tapered (e.g. cylindrical).

Other variations are possible within the scope of the claims.

What is claimed is:

1. A split mold insert for defining a relief portion of a molded article, comprising:
   a body defining a mold cavity for the relief portion of the molded article, the body having a male projecting portion with a shutoff face, the shutoff face for selectively defining, in a molding configuration of the split mold insert, a parting line with an adjacent mold stack component and, in a cleaning configuration of the split mold insert, a molding surface, the male projecting portion having an outer surface configured to cooperate with a female receptacle associated with the adjacent mold stack component to provide a melt barrier in the cleaning configuration of the split mold insert, the body being split into a plurality of split mold insert parts that are separable for ejection of the molded article, each split mold insert part having a mating face for mating with a complementary mating face of an adjacent one of the split mold insert parts, the mating face having an inner face region adjacent to the mold cavity, an offset, and an outer face region on an opposite side of the offset from the inner face region, wherein the offset terminates at the outer surface of the male projecting portion, wherein at least a part of the inner face region terminates at the shutoff face of the male projecting portion; and wherein the offset has a first portion that is substantially parallel to an axis of the split mold insert part and a second portion that diverges continuously from the axis towards the outer surface of the male projecting portion.

2. The split mold insert of claim 1 wherein the inner and outer face regions occupy different planes.

3. The split mold insert of claim 2 wherein the offset is orthogonal to each of the planes occupied by the inner face region and the outer face region respectively.

4. The split mold insert of claim 1 wherein the second portion of the offset is substantially orthogonal to the first portion of the offset.

5. The split mold insert of claim 1 wherein the second portion of the offset of the split mold insert part is at least partially curved.

6. The split mold insert of claim 5 wherein the offset of the split mold insert part is substantially J-shaped.

7. The split mold insert according to claim 1 wherein the offsets of the complementary mating faces overlap with one another and define a gap therebetween, the gap being substantially constant regardless of whether the split mold insert is in the cleaning configuration or in a molding configuration, the gap defining a vent permitting passage of gas, but preventing passage of melt, therethrough.

8. The split mold insert according to claim 1 wherein the male projecting portion of the split mold insert is tapered.

9. The split mold insert of claim 8 wherein the outer surface of the male projecting portion is frustoconical and wherein the offset terminates at the frustoconical outer surface.

10. The split mold insert according to claim 1 wherein the shutoff face of the male projecting portion is annular and has a rounded peripheral edge, wherein the male projecting portion has a flared base, and wherein the offset terminates in an outer surface of the male projecting portion between the rounded peripheral edge of the shutoff face and the flared base of the male projecting portion.

11. The split mold insert according to claim 1 wherein the plurality of split mold insert parts is a pair of split mold insert halves.

12. A mold stack for molding a molded article having relief portion, comprising:

a split mold insert split into a plurality of parts that are separable for ejection of the molded article, each split mold insert part having a mating face for mating with a complementary mating face of an adjacent one of the split mold insert parts, each mating face having an inner face region adjacent to a mold cavity, an offset, and an outer face region on an opposite side of the offset from the inner face region, the outer face region and the inner face region defining separate planes that are both parallel to a central axis of the split mold insert, the split mold insert further having a male projecting portion with a shutoff face and an outer surface, at least a part of the inner face region of each mating face terminating at the shutoff face of the male projecting portion, the offset of each mating face terminating at the outer surface of the male projecting portion; and an adjacent mold stack component having an associated female receptacle, the split mold insert having a cleaning configuration wherein:

the shutoff face of the male projecting portion acts as a molding surface;

the male projecting portion cooperates with the female receptacle to define a melt barrier, the complementary inner face regions of the split mold insert parts are spaced apart to form an extension of the mold cavity, the mold cavity extension terminating, at least in part, at the shutoff face of the split mold insert that acts as the molding surface; and the complementary offsets cooperate to prevent melt from passing therebetween and to guide melt towards the melt barrier;

wherein the offset of each mating face has a first portion that is substantially parallel to an operational axis of the mold stack and a second portion that diverges continuously from the operational axis towards the outer surface of the male projecting portion.

13. The mold stack of claim 12 wherein the adjacent mold stack component is a cavity insert and wherein the female receptacle is defined in a cavity flange associated with the cavity insert.

14. The mold stack according to claim 12 wherein the inner and outer face regions of the mating face of each split mold insert part occupy different planes.

15. The mold stack of claim 14 wherein the offset of each mating face is orthogonal to each of the planes occupied by the inner face region and the outer face region, respectively, of the mating face.

16. The mold stack of claim 12 wherein the second portion of the offset is substantially orthogonal to the first portion of the offset.

17. The mold stack of claim 12 wherein the second portion of the offset is at least partially curved.

18. The mold stack of claim 17 wherein the offset is substantially J-shaped.

19. The mold stack according to claim 12 wherein the offsets of the respective complementary mating faces overlap with one another and define a gap therebetween, the gap being substantially constant regardless of whether the split mold insert is in the cleaning configuration or in a molding configuration, the gap defining a vent permitting passage of gas, but preventing passage of melt, therethrough.

20. The mold stack according to claim 12 wherein the outer surface of the male projecting portion is frustoconical and wherein the offset terminates at the frustoconical outer surface.

21. The mold stack according to claim 12 wherein the shutoff face of the male projecting portion of the split mold insert is annular and has a rounded peripheral edge, wherein the male projecting portion has a flared base, and wherein the offset terminates in an outer surface of the male projecting portion between the rounded peripheral edge of the shutoff face and the flared base of the male projecting portion.

* * * * *